(12) United States Patent
Ohmori et al.

(10) Patent No.: US 10,790,533 B2
(45) Date of Patent: *Sep. 29, 2020

(54) FUEL CELL STACK

(71) Applicant: NGK INSULATORS, LTD., Nagoya-shi, Aichi (JP)

(72) Inventors: Makoto Ohmori, Nagoya (JP); Risako Ito, Nagoya (JP); Takashi Ryu, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 556 days.

This patent is subject to a terminal disclaimer.

(21) Appl. No.: 15/431,026

(22) Filed: Feb. 13, 2017

(65) Prior Publication Data
US 2017/0155165 A1 Jun. 1, 2017

Related U.S. Application Data

(63) Continuation of application No. PCT/JP2016/069246, filed on Jun. 29, 2016.

(30) Foreign Application Priority Data

Jul. 3, 2015 (JP) .................. 2015-134102
Jun. 23, 2016 (JP) .................. 2016-124218
(Continued)

(51) Int. Cl.
*H01M 8/2483* (2016.01)
*H01M 8/2484* (2016.01)
(Continued)

(52) U.S. Cl.
CPC ..... *H01M 8/2483* (2016.02); *H01M 8/04089* (2013.01); *H01M 8/04201* (2013.01);
(Continued)

(58) Field of Classification Search
CPC .... H01M 8/249; H01M 8/1097; H01M 8/243; H01M 8/2432; H01M 8/04089;
(Continued)

(56) References Cited

U.S. PATENT DOCUMENTS

2006/0147778 A1 7/2006 Matsuzaki et al.
2008/0038621 A1 2/2008 Ichigi et al.
(Continued)

FOREIGN PATENT DOCUMENTS

CN 1632976 A 6/2005
CN 103081199 A 5/2013
(Continued)

OTHER PUBLICATIONS

An English Translation of the Written Opinion of the International Search Authority for the corresponding international application No. PCT/JP2016/069246, dated Sep. 27, 2016.
(Continued)

*Primary Examiner* — Miriam Stagg
*Assistant Examiner* — Lilia Nedialkova
(74) *Attorney, Agent, or Firm* — Global IP Counselors, LLP

(57) ABSTRACT

A fuel cell stack (100) includes a first supporting substrate (5a), a first power generation element, a second power generation element, a second supporting substrate (5b) and a communicating member (3). The first supporting substrate (5a) includes a first substrate main portion, a first dense layer, and a first gas flow passage. The first dense layer covers the first substrate main portion. The second supporting substrate (5b) includes a second substrate main portion, a second dense layer, and a second gas flow passage. The second dense layer covers the second substrate main portion. The communicating member (3) extends between a distal end portion (502a) of the first supporting substrate (5a) and
(Continued)

a distal end portion (502b) of the second supporting substrate (5b) and communicates between the first gas flow passage and the second gas flow passage.

24 Claims, 23 Drawing Sheets

(30) Foreign Application Priority Data

Jun. 23, 2016 (JP) ................... 2016-124219
Jun. 23, 2016 (JP) ................... 2016-124220
Jun. 23, 2016 (JP) ................... 2016-124221

(51) Int. Cl.
  *H01M 8/249* (2016.01)
  *H01M 8/04089* (2016.01)
  *H01M 8/04082* (2016.01)
  *H01M 8/2485* (2016.01)
  *H01M 8/247* (2016.01)

(52) U.S. Cl.
  CPC ........... *H01M 8/247* (2013.01); *H01M 8/249* (2013.01); *H01M 8/2484* (2016.02); *H01M 8/2485* (2013.01); *Y02P 70/56* (2015.11)

(58) Field of Classification Search
  CPC ............. H01M 8/04201; H01M 8/247; H01M 8/2483; H01M 8/2484; H01M 8/2485; Y02P 70/56
  See application file for complete search history.

(56) References Cited

U.S. PATENT DOCUMENTS

| | | | |
|---|---|---|---|
| 2008/0138673 A1* | 6/2008 | Bech-Madsen ... | H01M 8/04089 429/443 |
| 2009/0104495 A1* | 4/2009 | Strutt ................. | H01M 4/8605 429/411 |
| 2011/0065022 A1 | 3/2011 | Min et al. | |
| 2012/0107715 A1 | 5/2012 | Ohmori et al. | |
| 2014/0004439 A1* | 1/2014 | Ohmori ............... | H01M 8/0282 429/458 |
| 2014/0315111 A1* | 10/2014 | Sato .................. | H01M 8/04753 429/423 |
| 2016/0164128 A1 | 6/2016 | Ono et al. | |

FOREIGN PATENT DOCUMENTS

| | | |
|---|---|---|
| JP | 6-310165 A | 11/1994 |
| JP | 2007-335213 A | 12/2007 |
| JP | 2008-66296 A | 3/2008 |
| JP | 2009-224299 A | 10/2009 |
| JP | 2011-60747 A | 3/2011 |
| JP | 2014-132518 A | 7/2014 |
| JP | 5551803 B1 | 7/2014 |
| JP | 2015-53186 A | 3/2015 |

OTHER PUBLICATIONS

An English Translation of the International Preliminary Report on Patentability for the corresponding international application No. PCT/JP2016/069246, dated Jan. 9, 2018.
International Search Report for the corresponding international application No. PCT/JP2016/069246 dated Sep. 27, 2016.

* cited by examiner

FUEL CELL STACK

TECHNICAL FIELD

The present invention relates to a fuel cell stack.

BACKGROUND ART

A fuel cell stack is known that includes a plurality of cells and a manifold configured to distribute gas to the respective cells. Each cell includes a porous supporting substrate and a power generation element supported by each supporting substrate. Fuel gas is supplied from the manifold to a gas flow passage in each supporting substrate by insertion of a proximal end portion of each supporting substrate into the manifold. Unreacted gas of the fuel gas that is supplied from the proximal end portion of the gas flow passage of each supporting substrate is discharged to an external portion from a distal end portion of the gas flow passage.

The fuel cell stack disclosed in Patent Literature 1 is configured to recover unreacted gas discharged from the distal end portion to an external portion in order to enhance the operating efficiency of the fuel gas. More specifically, the supporting substrate includes an outward gas flow passage and a return gas flow passage. The unreacted gas of the fuel gas supplied to the outward gas flow passage is re-used in power generated by the return gas flow passage. The fuel gas flowing in the return gas flow passage is not discharged from a distal end portion to an external portion, but rather is recovered from the proximal end portion to the manifold.

Since the supporting substrate is porous, the fuel gas may flow into the return gas flow passage without flowing to the end of the outward gas flow passage. That is to say, the fuel gas may flow within the supporting substrate along the outward gas flow passage and into the return gas flow passage. To prevent this type of short cut, a dense member is inserted between the outward gas flow passage and the return gas flow passage.

CITATION LIST

Patent Literature

[Patent Literature 1] Japanese Patent Application Laid-Open No. 2015-53186

SUMMARY OF INVENTION

Technical Problem

The fuel cell stack discussed above has problems related to difficulty of manufacture due to the requirement of insertion of a dense member into an inner portion of the porous supporting substrate. The problem of the present invention is to provide a fuel cell stack that can recover gas while facilitating manufacturing.

Solution to Problem

The fuel cell stack according to one aspect of the present invention includes a first supporting substrate, a first power generation element, a second supporting substrate, a second power generation element, and a communicating member. The first supporting substrate includes a first substrate main portion, a first dense layer, and a first gas flow passage. The first dense layer covers the first substrate main portion. The first gas flow passage extends from a proximal end portion to a distal end portion. The first power generation element is supported by a first principal surface of the first supporting substrate. The second supporting substrate includes a second substrate main portion, a second dense layer, and a second gas flow passage. The second dense layer covers the second substrate main portion. The second gas flow passage extends from a proximal end portion to a distal end portion. The second power generation element is supported by a first principal surface of the second supporting substrate. The communicating member extends between the distal end portion of the first supporting substrate and the distal end portion of the second supporting substrate and communicates between the first gas flow passage and the second gas flow passage.

The above configuration enables the unreacted gas of the fuel gas that flows in the first gas flow passage of the first supporting substrate to flow through the communicating member into the second gas flow passage without being discharged from the distal end portion of the first gas flow passage into an external portion. Consequently, it is possible to enhance the operating efficiency in relation to fuel gas. Furthermore, the first supporting substrate includes a first dense layer configured to cover the first substrate main portion. The second supporting substrate includes a second dense layer configured to cover the second substrate main portion. The first and second dense layers are denser than the first and second substrate main portions, and therefore the fuel gas that flows in the first gas flow passage can be inhibited from flowing through the first and second substrate main portions into the second gas flow passage. Furthermore, the first dense layer may be simply formed to merely cover the first substrate main portion.

The fuel cell stack may further include a third power generation element and a fourth power generation element. The third power generation element is supported by a second principal surface of the first supporting substrate. The fourth power generation element is supported by a second principal surface of the second supporting substrate. The first power generation element may be connected in series with the third power generation element. The second power generation element may be connected in series with the fourth power generation element.

A first power generation element assembly formed from the first power generation element and the third power generation element may be connected in series with a second power generation element assembly formed from the second power generation element and the fourth power generation element.

The first power generation element assembly formed from the first power generation element and the third power generation element may be connected in parallel with the second power generation element assembly formed from the second power generation element and the fourth power generation element.

The fuel cell stack may further include a third power generation element and a fourth power generation element. The third power generation element is supported a second principal surface of the first supporting substrate. The fourth power generation element is supported a second principal surface of the second supporting substrate. The first power generation element may be connected in series with the second power generation element. The third power generation element may be connected in series with the fourth power generation element.

A third power generation element assembly formed from the first power generation element and the second power generation element may be connected in series with the fourth power generation element assembly formed from the third power generation element and the fourth power generation element.

A third power generation element assembly formed from the first power generation element and the second power generation element may be connected in parallel with the fourth power generation element assembly formed from the third power generation element and the fourth power generation element.

The fuel cell stack may include a plurality of the first power generation elements, a plurality of the second power generation elements, a plurality of the third power generation elements, and a plurality of the fourth power generation elements. Each of the first and the third power generation elements is disposed with an interval along the longitudinal direction of the first supporting substrate. Each of the second and the fourth power generation elements is disposed with an interval along the longitudinal direction of the second supporting substrate.

Each of the first power generation elements may be mutually connected in series. Each of the second power generation elements may be mutually connected in series. Each of the third power generation elements may be mutually connected in series. Each of the fourth power generation elements may be mutually connected in series.

The fuel cell stack may include a plurality of the first supporting substrates, a plurality of the first power generating elements, a plurality of the second supporting substrates, and a plurality of the second power generating elements. Each of the first supporting substrates is mutually disposed with an interval. The first supporting substrates support the first power generation elements. The first power generation element supported on each of the first supporting substrates is connected in series with the first power generation element supported on adjacent first supporting substrates. Each of the second supporting substrates is mutually disposed with an interval. The second supporting substrates support the second power generation elements. The second power generation element supported on each of the second supporting substrates is connected in series with the second power generation element supported on adjacent second supporting substrates.

A fifth power generation element assembly formed from the plurality of the first power generation elements may be connected in series with a sixth power generation element assembly formed from the plurality of the second power generation elements.

The fifth power generation element assembly formed from the plurality of the first power generation elements may be connected in parallel with a sixth power generation element assembly formed from the plurality of the second power generation elements.

The first supporting substrates may support the plurality of first power generation elements. Each of the first power generating elements is disposed with an interval along the longitudinal direction of the first supporting substrate. Each of the second supporting substrates may support the plurality of the second power generation elements. Each of the second power generation elements is disposed with an interval along the longitudinal direction of the second supporting substrate.

Each of the first power generation elements on each first supporting substrate may be mutually connected in series. Each of the second power generation elements on each second supporting substrate may be mutually connected in series.

The first power generation element may be connected in series with the second power generation element.

The fuel cell stack may include a plurality of the first power generation elements and a plurality of the second power generation elements. Each of the first power generation elements is mutually disposed with an interval along the longitudinal direction of the first supporting substrate. Each of the second power generation elements is mutually disposed with an interval along the longitudinal direction of the second supporting substrate.

Each of the first power generation elements may be mutually connected in series. Each of the second power generation elements may be mutually connected in series. One first power generation element of the first power generation elements may be connected in series with one second power generation element of the second power generation elements.

The fuel cell stack may include a plurality of seventh power generation element aggregate bodies. Each of the seventh power generation element aggregate bodies is configured from a pair of the first and the second power generation elements that are mutually connected in series.

Each of the seventh power generation element aggregate bodies may be mutually connected in series.

Each of the seventh power generation element aggregate bodies may be mutually connected in parallel.

The first supporting substrate and the second supporting substrate may be disposed so that a side surface of the first supporting substrate and a side surface of the second supporting substrate are facing.

It is preferred that the fuel cell stack further includes a manifold that is configured to support the first and second supporting substrates. Fuel gas can be distributed into each gas flow passage by such a manifold.

It is preferred that the manifold includes a first chamber and a second chamber. The first gas flow passage communicates with the first chamber. The second gas flow passage communicates with the second chamber. This configuration enables fuel gas to flow smoothly in sequence into the first gas flow passage, the communicating member, and the second gas flow passage by supplying fuel gas to the first chamber.

It is preferred that the manifold includes a manifold main portion and a partition. The manifold main portion includes a cavity. The partition partitions the cavity into the first chamber and the second chamber. This configuration facilitates manufacture of a manifold that includes the first chamber and the second chamber.

It is preferred that the first dense layer includes a first electrolyte, and the second dense layer includes a second electrolyte.

Advantageous Effects of Invention

The fuel cell stack according to the present invention can recover gas while facilitating manufacturing of the fuel cell stack.

DESCRIPTION OF EMBODIMENTS

Figure 1:
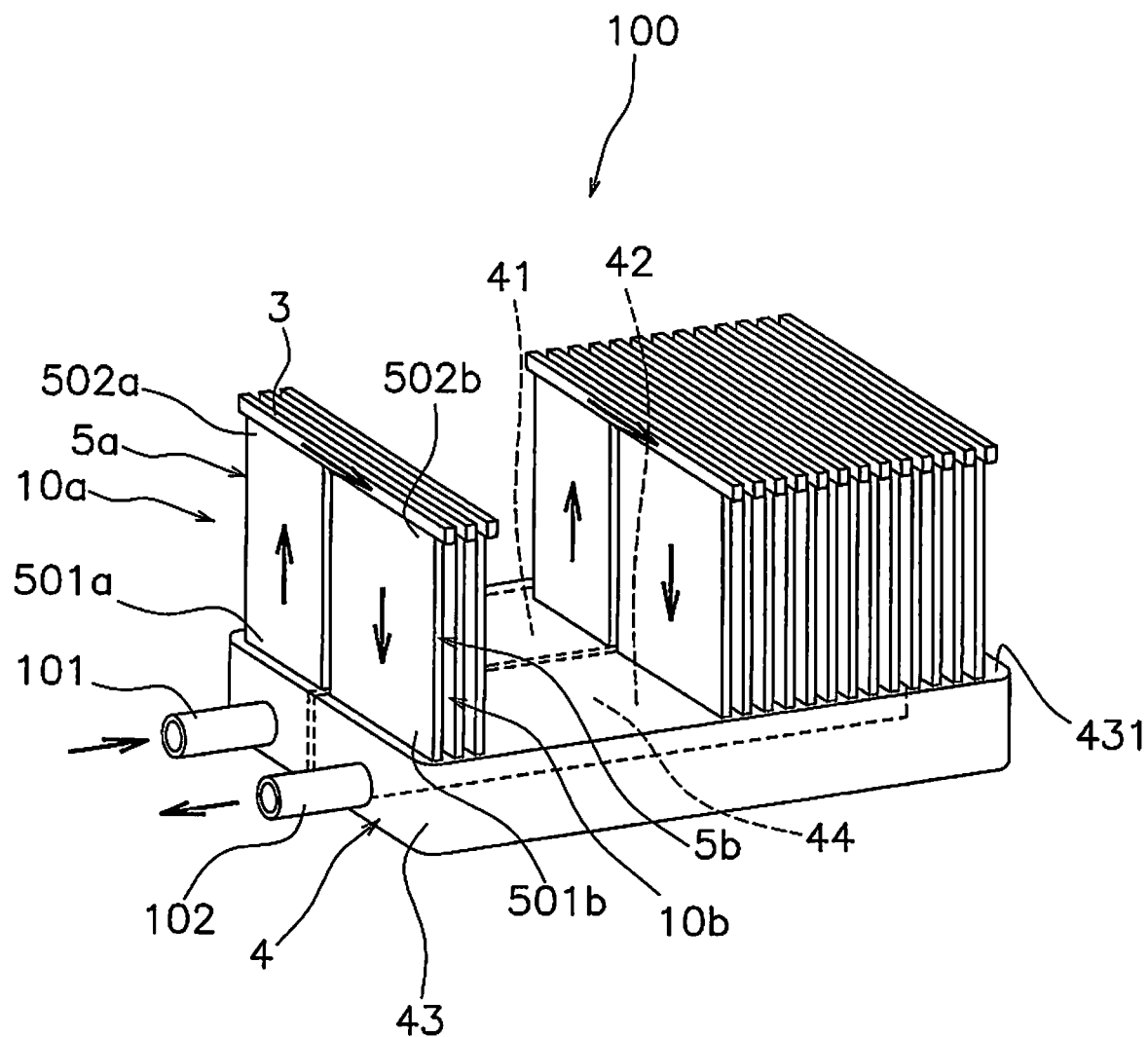
FIG. 1 is a perspective view of a fuel cell stack.

An embodiment of a fuel cell stack according to the present invention will be described below making reference to the figures. FIG. 1 is a perspective view of a fuel cell stack. FIG. 1 omits illustration of several first and second cells.

Fuel Cell Stack

As illustrated in FIG. 1, a fuel cell stack 100 includes a plurality of first cells 10a, a plurality of second cells 10b, a communicating member 3, and a manifold 4. In the following description, the letter "a" is applied to the end of the reference numeral of constituent members of the first cells 10a, and the letter "b" is applied to the end of the reference numeral of constituent members of the second cells 10b. The first cells 10a and the second cells 10b have substantially the same configuration, and therefore only the constituent members of the first cells 10a will be described below. Detailed description of the constituent members of the second cells 10b by addition of a reference numeral corresponding to the constituent members of the first cells 10a will be omitted.

Manifold

The manifold 4 is configured to support the first and second cells 10a, 10b. The manifold 4 includes a first chamber 41 and a second chamber 42. A gas supply portion 101 is connected to the first chamber 41 and a gas discharge portion 102 is connected to the second chamber 42. The first chamber 41 is supplied with fuel gas through the gas supply portion 101. Furthermore, fuel gas in the second chamber 42 is discharged from the manifold 4 through the gas discharge portion 102.

The manifold 4 includes a manifold main portion 43 and a partition 44. The inner portion of the manifold main portion 43 includes a cavity. The manifold main portion 43 has a rectangular parallelopiped shape. A plurality of first and second insertion holes (not shown) are formed in an upper plate 431 of the manifold main portion 43. The first cells 10a are inserted into the first insertion holes and the second cells 10b are inserted into the second insertion holes. The first insertion holes communicate with the first chamber 41 and the second insertion holes communicate with the second chamber 42.

Each of the first insertion holes is arranged side by side with an interval in the longitudinal direction (z axis direction) of the manifold main portion 43. Each of the second insertion holes is also arranged side by side with an interval in the longitudinal direction (z axis direction) of the manifold main portion 43. The first insertion holes and the second insertion holes are arranged side by side with an interval in the transverse direction (y axis direction) of the manifold main portion 43.

The partition 44 partitions the cavity of the manifold main portion 43 into the first chamber 41 and the second chamber 42. More specifically, the partition 44 extends in a longitudinal direction of the manifold main portion 43 in approximately the central portion of the manifold main portion 43. The partition 44 is not required to completely partition the cavity of the manifold main portion 43, and a space may be formed between the partition 44 and the manifold main portion 43.

First Cell

The first cells 10a are disposed above the first chamber 41 of the manifold 4. The first cells 10a are inserted into the first insertion holes of the manifold 4. The second cells 10b are disposed above the second chamber 42 of the manifold 4. The second cells 10b are inserted into the second insertion holes of the manifold 4.

Each first cell 10a is arranged so that the principal surfaces thereof are facing. Furthermore, each first cell 10a is arranged with an interval along the longitudinal direction of the manifold 4. Each second cell 10b is arranged so that the principal surfaces thereof are facing. Furthermore, each second cell 10b is arranged with an interval along the longitudinal direction of the manifold 4. The row of first cells 10a and the row of second cells 10b are disposed in a substantially parallel configuration. The first cell 10a and the second cell 10b are disposed so that the side surfaces are facing.

Figure 2:
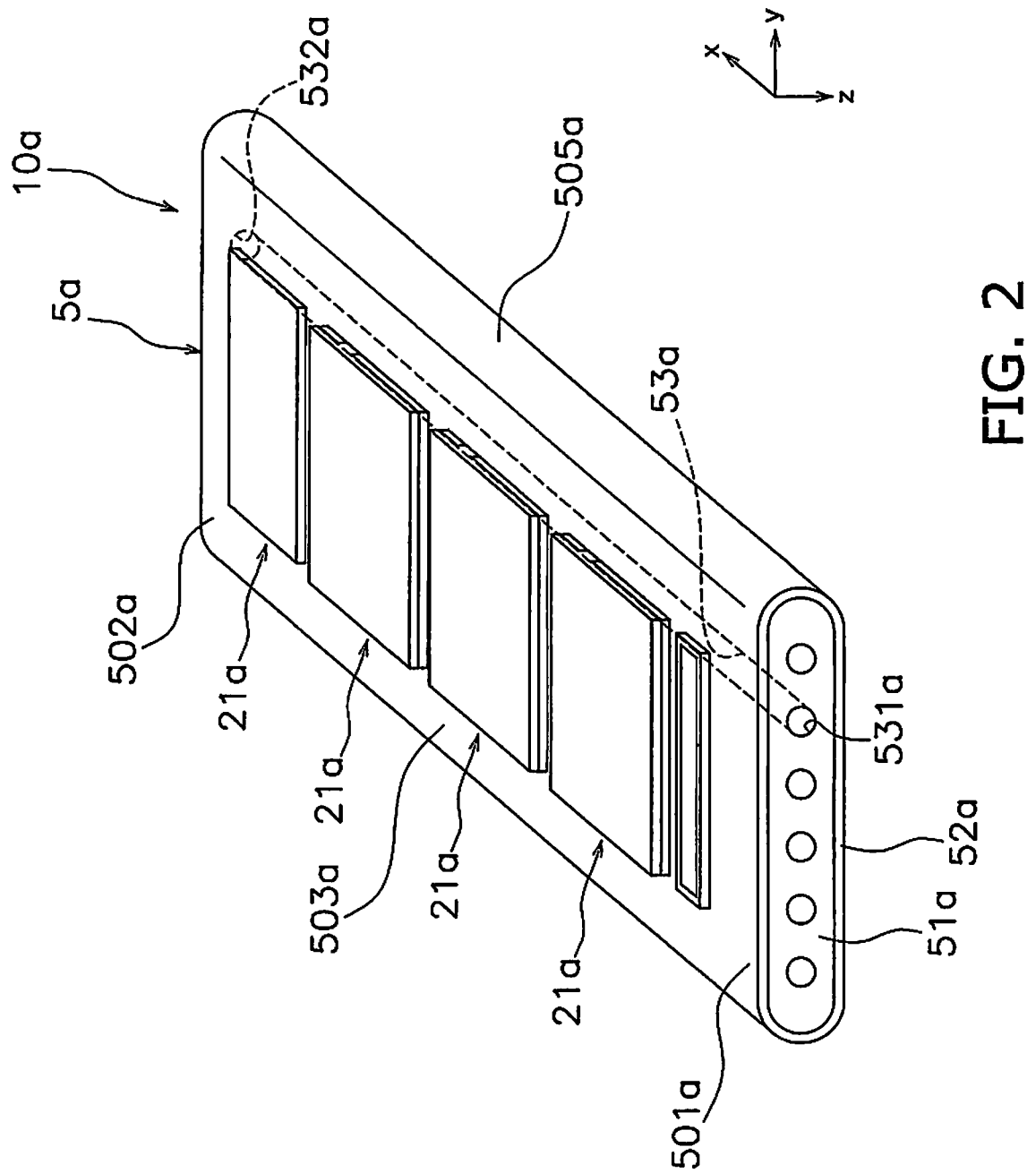
FIG. 2 is a perspective view of a first cell.
Figure 3:
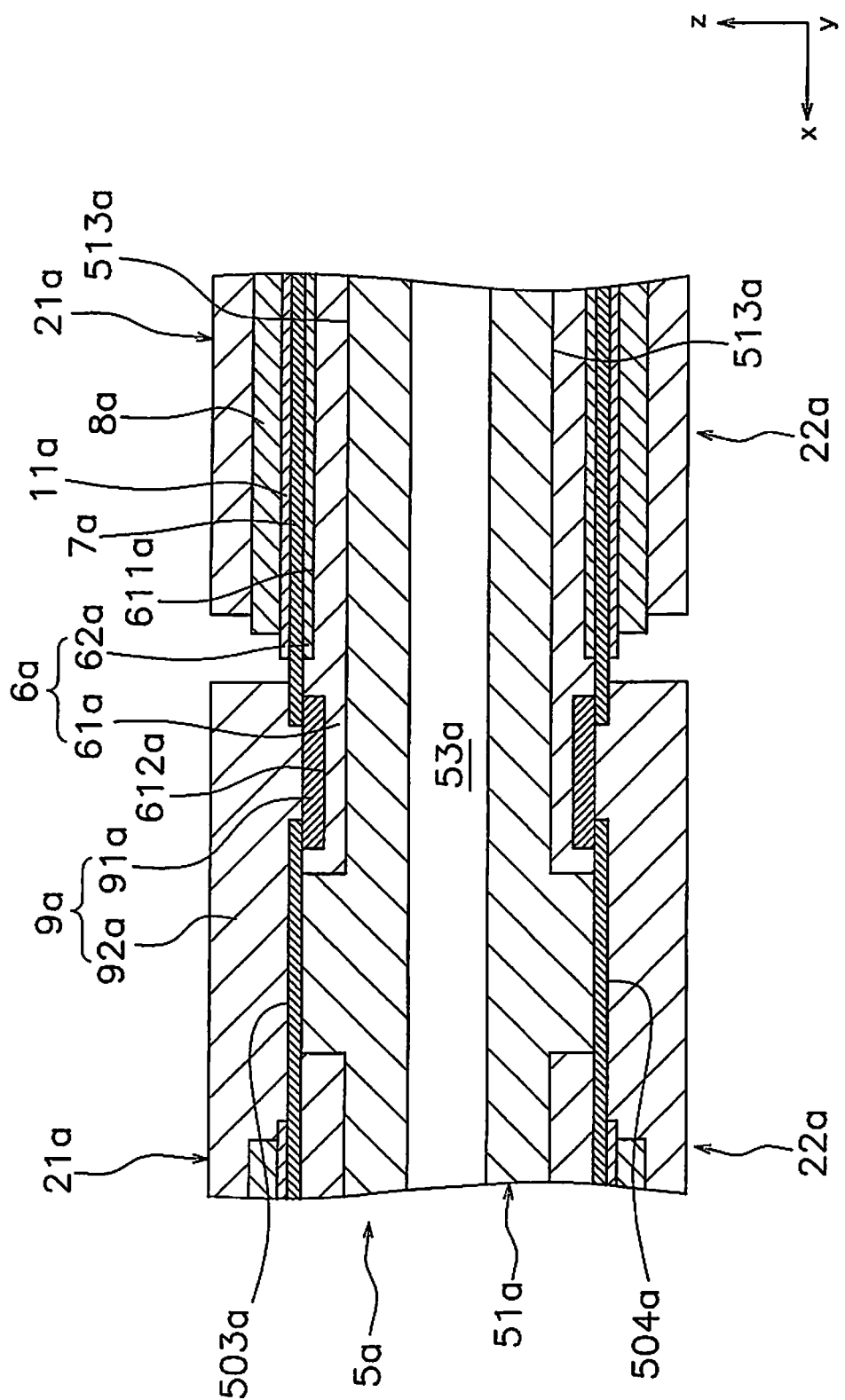
FIG. 3 is a sectional view of the first cell.

As illustrated in FIG. 2 and FIG. 3, the first cells 10a include a first supporting substrate 5a, a plurality of first power generation elements 21a, and a plurality of third power generation elements 22a. Each first power generation element 21a is supported by the first principal surface 503a of the first supporting substrate 5a. Each third power generation element 22a is supported by the second principal surface 504a of the first supporting substrate 5a.

First Supporting Substrate

The first supporting substrate 5a includes a first substrate main portion 51a, a first dense layer 52a, and a plurality of first gas flow passages 53a. The first supporting substrate 5a includes a proximal end portion 501a and a distal end portion 502a. The proximal end portion 501a and the distal end portion 502a are both end portions in the longitudinal direction (x axis direction) of the first supporting substrate 5a. The proximal end portion 501a of the first supporting substrate 5a is inserted into the first insertion holes of the manifold 4.

The first supporting substrate 5a includes a first principal surface 503a, a second principal surface 504a, and a pair of side surfaces 505a. The first principal surface 503a and the second principal surface 504a are oriented in mutually opposite directions. The first principal surface 503a supports each first power generation element 21a. The second principal surface 504a supports each third power generation element 22a. The first principal surface 503a and the second principal surface 504a face the direction of thickness (z axis direction) of the first supporting substrate 5a. Each side surface 505a faces the transverse direction (y axis direction) of the first supporting substrate 5a. Each side surface 504a may be curved. As illustrated in FIG. 1, each first support substrate 5a is disposed so that the first principal surface 503a and the second principal surface 504a are facing.

As illustrated in FIG. 2 and FIG. 3, the first substrate main portion 51a supports the first power generation element 21a and the third power generation element 22a. The first substrate main portion 51a is configured from a porous material that does not exhibit electrical conductivity. The first substrate main portion 51a is configured for example from CSZ (calcia-stabilized zirconia). In addition, the first substrate main portion 51a may be configured from NiO (nickel oxide) and YSZ (8YSZ) (yttria-stabilized zirconia), may be configured by NiO (nickel oxide) and $Y_2O_3$ (yttria), or may be configured by MgO (magnesium oxide) and $MgAl_2O_4$ (magnesia alumina spinel). The porosity of the first substrate main portion 51a is for example about 20 to 60%. For example, the porosity is measured by an Archimedes method or by microscopic observation.

The first dense layer 52a covers the first substrate main portion 51a. It is sufficient if the first dense layer 52a is configured to inhibit flow of fuel gas that is flowing in the first gas flow passage 53a through the first substrate main portion 51a to the second gas flow passage 53b, and there is no requirement to cover the entire surface of the first substrate main portion 51a. In the present embodiment, the first dense layer 52a covers each principal surface and each side surface of the first substrate main portion 51a. That is to say, the first dense layer 52a configures each principal surface 503a of the first supporting substrate 5a, and configures each side surface 505a of the first supporting substrate 5a. In the present embodiment, the first dense layer 52a is configured by a first electrolyte 7a described below and a first interconnector 91a. The first dense layer 52a is denser than the first substrate main portion 51a. For example, the porosity of the first dense layer 52a is about 0-7%.

The first gas flow passage 53a extends from the proximal end portion 501a to the distal end portion 502a of the first supporting substrate 5a. The first gas flow passage 53a extends along the longitudinal direction (x axis direction) of the first supporting substrate 5a. Furthermore, the first gas flow passage 53a extends through the first substrate main portion 51a. The proximal end portion 531a of the first gas flow passage 53a communicates with the first chamber 41. Furthermore, the distal end portion 532a of the first gas flow passage 53a communicates with the flow passage 30 of the communicating member 3 described below.

First Power Generation Element

As illustrated in FIG. 3, the plurality of first power generation elements 21a is supported on the first principal surface 503a of the first supporting substrate 5a. Each of the first power generation elements 21a is disposed with an interval along the longitudinal direction (x axis direction) of the first supporting substrate 5a. Each of the first power generation elements 21a on the first supporting substrate 5a is mutually connected in series by a first electrical connection portion 9a.

The first power generation element 21a includes a first anode 6a, a first electrolyte 7a and a first cathode 8a. The first power generation element 21a further includes a first reaction prevention membrane 11a. The first anode 6a is configured as a fired body formed from a porous material that exhibits electrical conductivity. The first anode 6a includes a first anode current collecting portion 61a and an anode active portion 62a.

The first anode current collecting portion 61a is disposed in a recessed portion 513a. The recessed portion 513a is formed on both surfaces of the first substrate main portion 51a. More specifically, the first anode current collecting portion 61a is filled into the recessed portion 513a, to thereby have the same external shape as the recessed portion 513a. Each of the first anode current collecting portions 61a has a recessed portion 611a and a recessed portion 612a. The anode active portion 62a is disposed in the recessed portion 611a. More specifically, the anode active portion 62a is filled into the recessed portion 611a.

The first anode current collecting portion 61a for example is configured by NiO (nickel oxide) and YSZ (8YSZ) (yttria-stabilized zirconia). Alternatively, the first anode current collecting portion 61a may be configured by NiO (nickel oxide) and $Y_2O_3$ (yttria), or configured by NiO (nickel oxide) and CSZ (calcia-stabilized zirconia). The thickness of the first anode current collecting portion 61a and the depth of the recessed portion 513a are about 50 to 500 microns.

The anode active portion 62a for example is configured by NiO (nickel oxide) and YSZ (8YSZ) (yttria-stabilized zirconia). Alternatively, the anode active portion 62a may be configured by NiO (nickel oxide) and GDC (gadolinium doped ceria). The thickness of the anode active portion 62a is about 5 to 30 microns.

The first electrolyte 7a is disposed to cover the first anode 6a. More specifically, the first electrolyte 7a extends in a longitudinal direction from one first interconnector 91a to another first interconnector 91a. That is to say, the first electrolyte 7a is disposed in an alternating configuration with the first interconnector 91a in a longitudinal direction. The first electrolyte 7a covers each principal surface and each side surface of the first substrate main portion 51a.

The first electrolyte 7a is denser that the first substrate main portion 51a. For example, the porosity of the first electrolyte 7a is about 0 to 7%. The first electrolyte 7a is configured as a fired body formed from a dense material that exhibits ionic conductivity but that does not exhibit electrical conductivity. The first electrolyte 7a for example is configured by YSZ (8YSZ) (yttria-stabilized zirconia). Alternatively, the first electrolyte 7a may be configured by LSGM (lanthanum gallate). The thickness of the first electrolyte 7a is for example about 3 to 50 microns.

The first reaction prevention membrane 11a is configured as a fired body formed from a dense material, and when viewed in plan, has approximately the same shape as the anode active portion 62a. The first reaction prevention membrane 11a is disposed through the first electrolyte 7a at a position that corresponds to the anode active portion 62a. The first reaction prevention membrane 11a is disposed to prevent an occurrence of a phenomenon in which a reaction layer is formed that exhibits a large electrical resistance at the interface of the first electrolyte 7a and the first cathode 8a as a result of a reaction between Sr in the first cathode 8a with YSZ in the first electrolyte 7a. The first reaction prevention membrane 11a for example is configured from GDC=(Ce,Gd)$O_2$ (gadolinium doped ceria). The thickness of the first reaction prevention membrane 11a is for example about 3 to 50 microns.

The first cathode 8a is disposed on the first reaction prevention membrane 11a. The first cathode 8a is configured as a fired body formed from a porous material that exhibits electrical conductivity. The first cathode 8a is configured for example from LSCF=(La, Sr) (Co, Fe) $O_3$ (lanthanum strontium cobalt ferrite). Alternatively, it may be configured from LSF=(La, Sr) Fe$O_3$ (lanthanum strontium ferrite), LNF=La (Ni, Fe) $O_3$ (lanthanum nickel ferrite), LSC=(La, Sr)Co$O_3$ (lanthanum strontium cobaltite, or the like. Furthermore, the first cathode 8a may be configured from two layers being a first layer (inner layer) formed from LSCF and a second layer (outer layer) formed from LSC. The thickness of the first cathode 8a is for example 10 to 100 microns.

The first electrical connection portion 9a is configured so that adjacent first power generation elements 21a are electrically connected. The first electrical connection portion 9a includes a first interconnector 91a and a first cathode current collecting portion 92a. The first interconnector 91a is disposed in the recessed portion 612a. More specifically, the first interconnector 91a is embedded (filled) into the recessed portion 612a. The first interconnector 91a is configured as a fired body formed from a dense material that exhibits electrical conductivity. The first interconnector 91a is denser than the first substrate main portion 51a. For example, the porosity of the first interconnector 91a is about 0 to 70%. The first interconnector 91a is configured for example from LaCr$O_3$ (lanthanum chromite), or may be configured by (Sr, La) Ti$O_3$ (strontium titanate). The thickness of the first interconnector 91a is for example 10 to 100 microns.

The first cathode current collecting membrane 92a is disposed to extend between the first cathode 8a and the first interconnector 91a of adjacent first power generation elements 21a. For example, the first cathode current collecting membrane 92a is disposed to electrically connect the first interconnector 91a of the first power generation element 21a disposed on the right side of FIG. 3 with the first cathode 8a of the first power generation portion 21a disposed on the left side of FIG. 3. The first cathode current collecting membrane 92a is configured as a fired body formed from a porous material that exhibits electrical conductivity.

The first cathode current collecting membrane 92a may be configured for example from LSCF=(LaSr) (CoFe)$O_3$ (lanthanum strontium cobalt ferrite). Alternatively, it may be configured from LSC=(La, Sr)Co$O_3$ (lanthanum strontium cobaltite), or it may be configured from Ag (silver), Ag—Pd (silver palladium alloy). The thickness of the first cathode current collecting membrane 92a is for example 50 to 500 microns.

Third Power Generation Element

The plurality of third power generation elements 22a is supported on the second principal surface 504a of the first supporting substrate 5a. Each of the third power generation elements 22a is disposed with an interval along the longitudinal direction of the first supporting substrate 5a. Furthermore, each of the third power generation elements 22a on the first supporting substrate 5a is mutually connected in series. With the exception of the position of disposition, since the third power generation elements 22a have the same configuration as the first power generation elements 21a, detailed description will be omitted.

Second Cell

Figure 4:
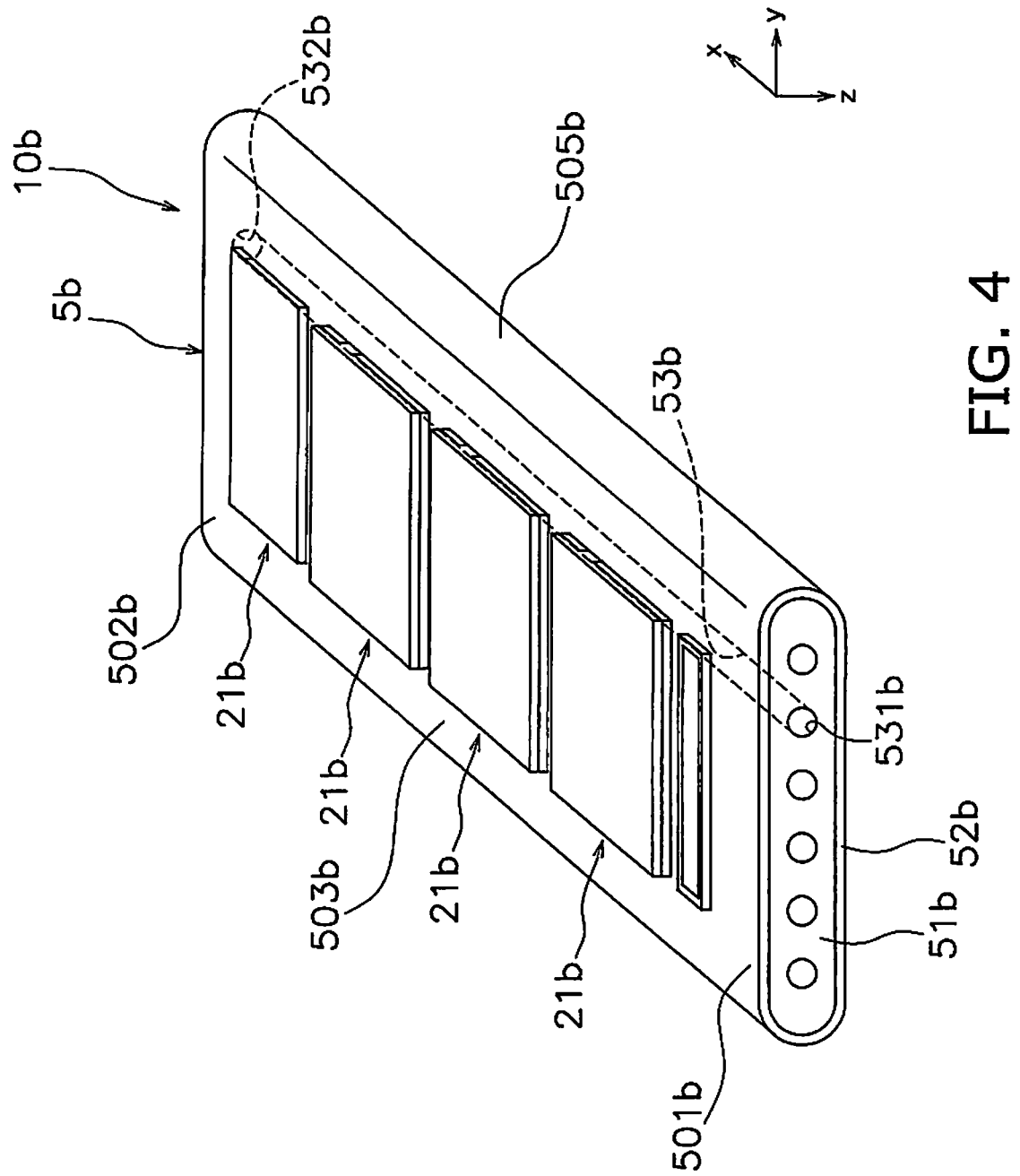
FIG. 4 is a perspective view of a second cell.
Figure 5:
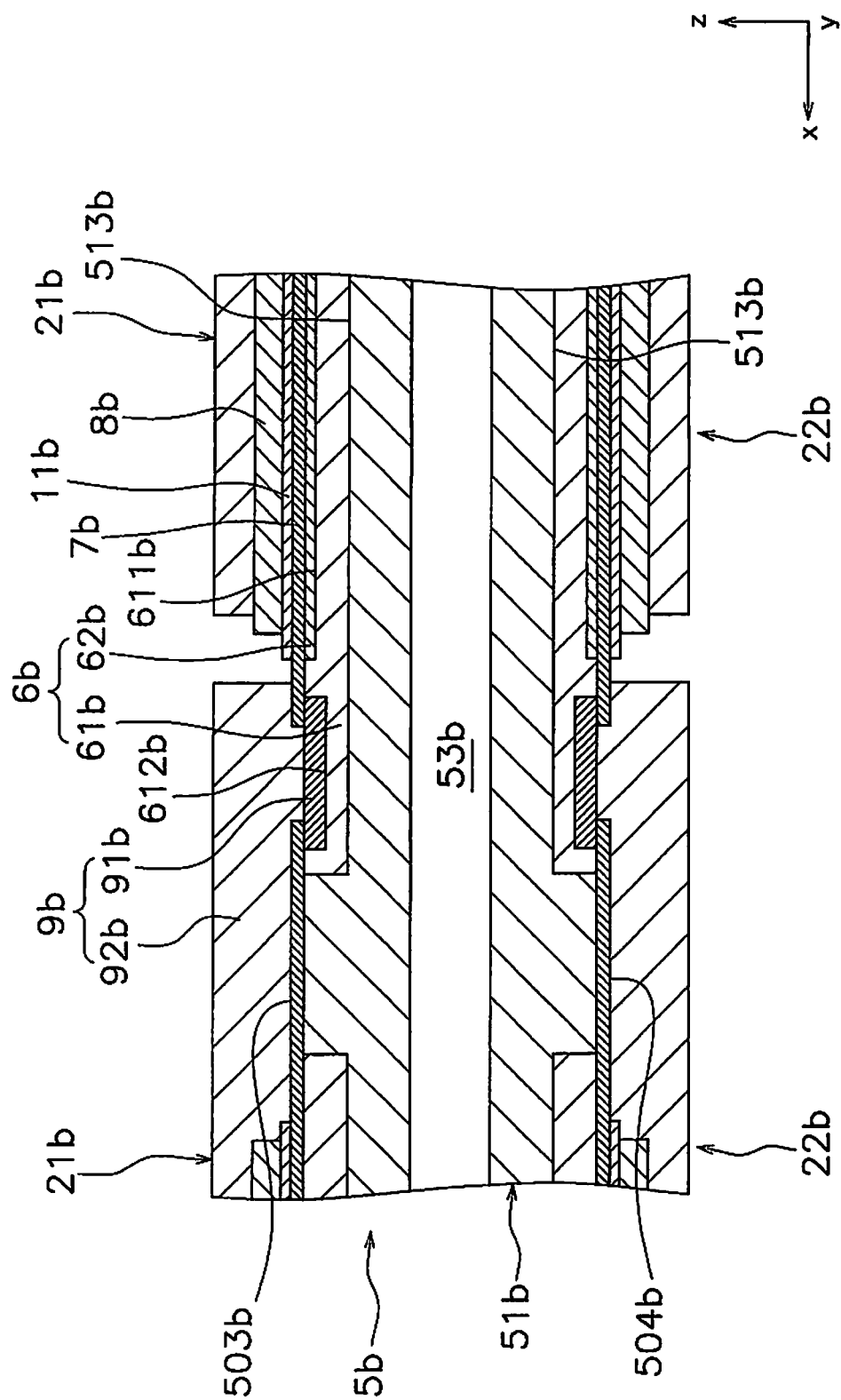
FIG. 5 is a sectional view of the second cell.

As illustrated in FIG. 4 and FIG. 5, the second cells 10b include a second supporting substrate 5b, a plurality of second power generation elements 21b, and a plurality of fourth power generation elements 22b.

The second supporting substrate 5b includes a second substrate main portion 51b, a second dense layer 52b and a second gas flow passage 53b. Furthermore, the second supporting substrate 5b includes a proximal end portion 501b and a distal end portion 502b. The proximal end portion 501b of the second supporting substrate 5b is inserted into the second insertion hole of the manifold 4.

The second supporting substrate 5b includes a first principal surface 503b, a second principal surface 504b and a pair of side surfaces 505b. The first principal surface 503b of the second supporting substrate 5b is oriented in the same direction as the first principal surface 503a of the first supporting substrate 5a. Furthermore, the second principal surface 504b of the second supporting substrate 5b is oriented in the same direction as the second principal surface 504a of the first supporting substrate 5a. Each first principal surface 503a, 503b of the adjacent pair of the first and second supporting substrates 5a, 5b is disposed substantially in the same plane. Each first principal surface 503a, 503b may deviate from each other in the direction of thickness (z axial direction) of each supporting substrate 5a, 5b. In the same manner, each second principal surface 504a, 504b may deviate from each other in the direction of thickness (z axial direction) of each supporting substrate 5a, 5b.

The second substrate main portion 51b supports the plurality of second power generation elements 2b and the plurality of fourth power generation elements 22b. The second dense layer 52b covers the second substrate main portion 51b. The second gas flow passage 53b extends from the proximal end portion 501b to the distal end portion 502b of the second supporting substrate 5b.

Each second power generation element 21b is supported on the first principal surface 503b of the second supporting substrate 5b. Each second power generation element 21b is disposed with an interval along the longitudinal direction (x axis direction) of the second supporting substrate 5b. Each second power generation element 21b on the second supporting substrate 5b is connected in series by the second electrical connection portion 9b.

Each fourth power generation element 22b is supported on the second principal surface 504b of the second supporting substrate 5b. Each fourth power generation element 22b is disposed with an interval along the longitudinal direction (x axis direction) of the second supporting substrate 5b. Each fourth power generation element 22b on the second supporting substrate 5b is mutually connected in series.

The second power generation element 2b includes a second anode 6b, a second electrolyte 7b and a second cathode 8b. As described above, each second cell 10b has substantially the same configuration as the first cells 10a, and therefore detailed description will be omitted. In the same manner the detailed description of the fourth power generation element 22b will be omitted. The first to fourth power generation elements 21a, 22a, 21b, 22b may have mutually different sizes, and the number in which they are formed may also be different. For example, the second power generation element 21b may have a larger surface area in contact with fuel gas than the first power generation element 21a. That is to say, the surface area of the second anode 6b may be larger than the surface area of the first anode 6a. Furthermore, the surface area of the second cathode 8b may be larger than the surface area of the first cathode 8a. It is naturally the case that the surface area of the second anode 6b may be the same as the surface area of the first anode 6a, or may be smaller than the surface area of the first anode 6a. In addition, the surface area of the second cathode 8b may be the same as the surface area of the first cathode 8a, or may be smaller than the surface area of the first cathode 8a. The same comments apply to the fourth power generation element 22b.

As illustrated in FIG. 1, the first and second supporting substrates 5a, 5b are disposed so that the side surface 505a of the first supporting substrate 5a and the side surface 505b of the second supporting substrate 5b face each other. A space may be formed between the first supporting substrate 5a and the second supporting substrate 5b. Furthermore, the side surface 505a of the first supporting substrate 5a and the side surface 505b of the second supporting substrate 5b may be in contact.

Communicating Member

Figure 6:
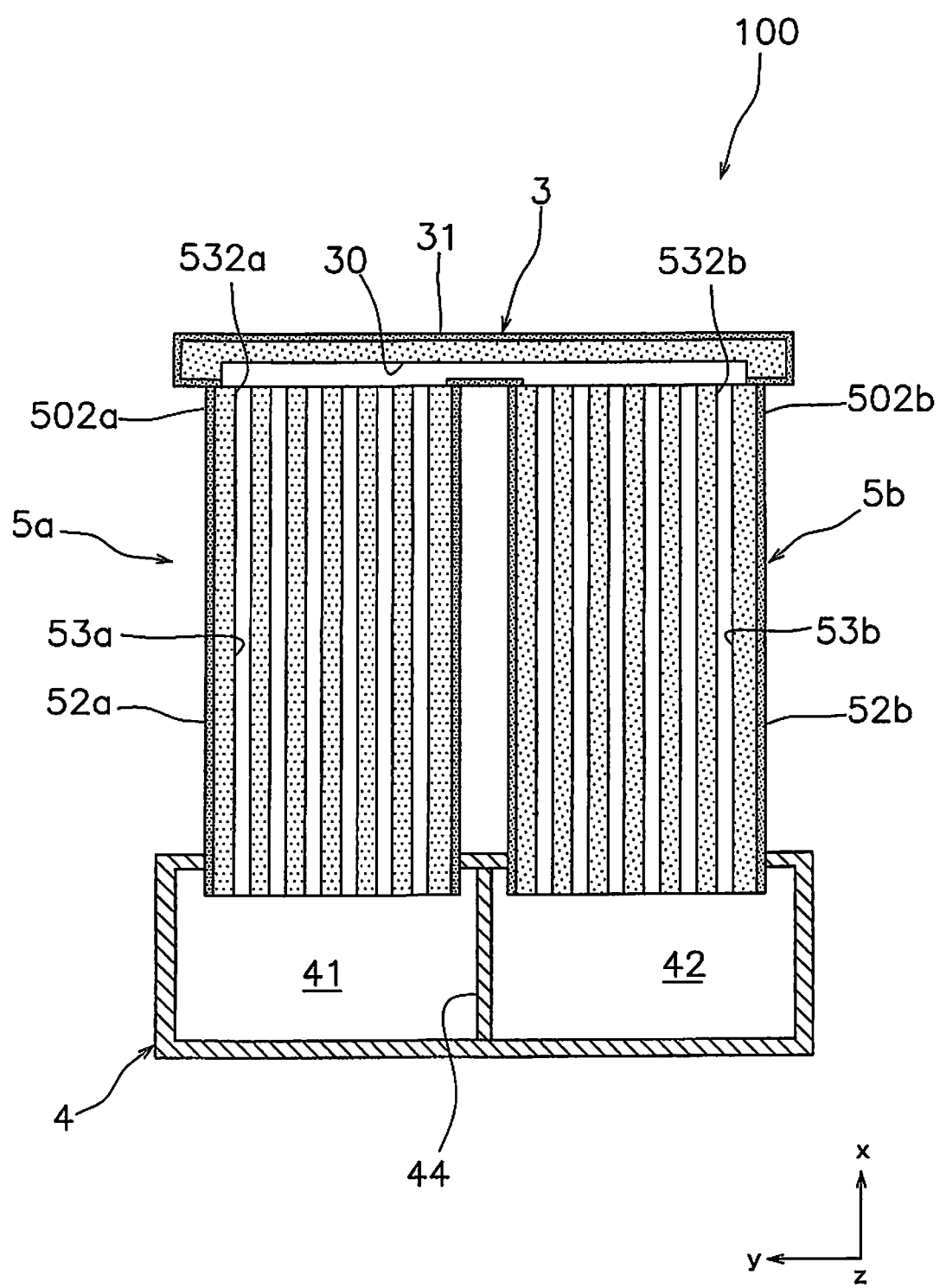
FIG. 6 is a sectional view of the fuel cell stack.

As illustrated in FIG. 6, the communicating member 3 extends across the distal end portion 502a of the first supporting substrate 5a and the distal end portion 502b of the second supporting substrate 5b. The communicating member 3 includes a passage 30 that communicates with the first gas flow passage 53a and the second gas flow passage 53b. More specifically, the passage 30 communicates with the distal end portion 532a of each first gas flow passage 53a and the distal end portion 532b of each second gas flow passage 53b. The passage 30 is configured as a cavity that extends from each first gas flow passage to each second gas flow passage. The communicating member 3 is preferably bonded to the first supporting substrate 5a and the second supporting substrate 5b.

The communicating member 3 is porous. The communicating member 3 includes a third dense layer 31 that configures its outer surface. The third dense layer 31 is formed to be denser than the main body of the communicating member 3. For examples, the porosity of the third dense layer 31 is about 0 to 7%. The third dense layer 31 may be formed using the same material as the communicating member 3, the same material as that used in the first and second electrolyte 7a, 7b discussed above, crystalized glass, or the like.

Electrical Connection

Figure 7:
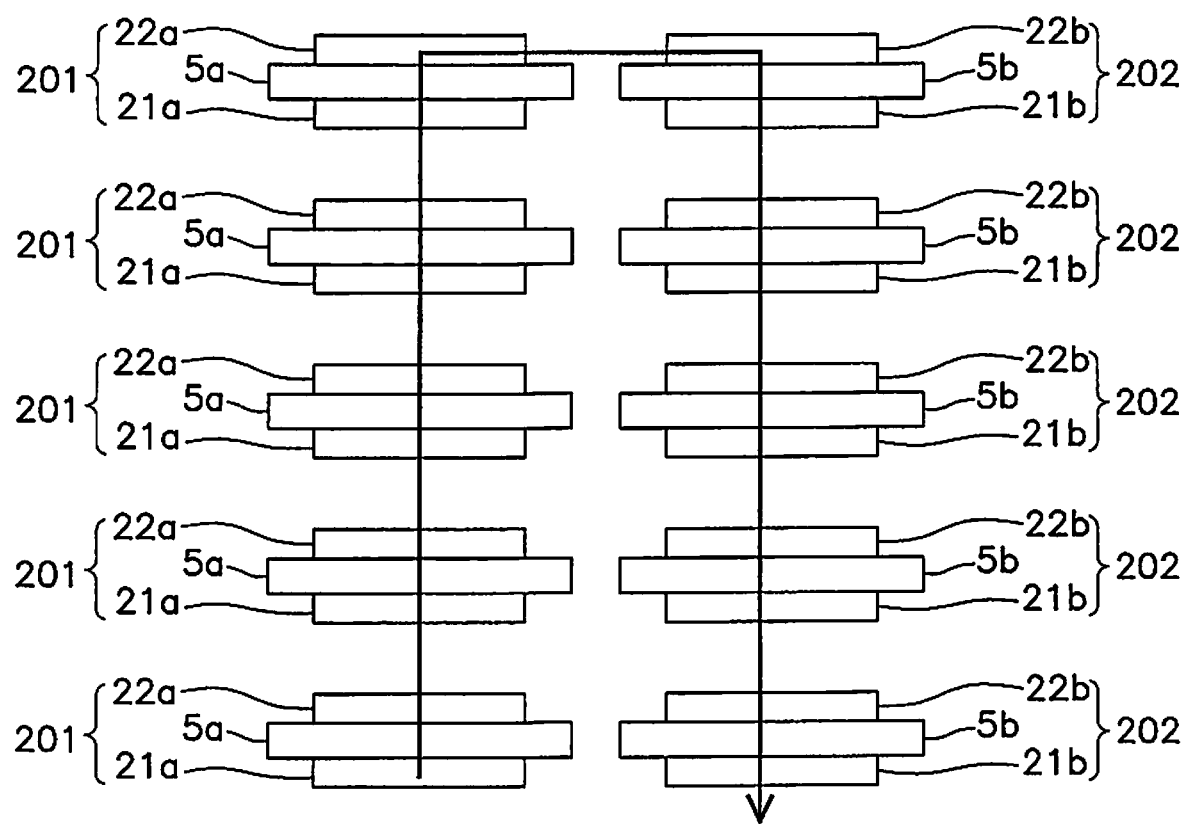
FIG. 7 is a schematic view illustrating the electrical connection relationships between each power generation element.

FIG. 7 is a schematic view illustrating the electrical connection relationships between each power generation element. The arrow shown in FIG. 7 illustrates the electrical connection relationships. As illustrated in FIG. 7, the first power generation element 21a on the first principal surface 503a and the third power generation element 22a on the second principal surface 504a are connected in series on each first supporting substrate 5a. For example, the first power generation element 21a and the third power generation element 22a are connected by a current collecting member that extends from the first principal surface 503a to the second principal surface 504a. The first power generation element 21a and the third power generation element 22a that are connected in series on each first supporting substrate 5a configure the first power generation element assembly 201. The current collecting member that connects the first power generation element 21a and the third power generation element 22a can be formed from the same material as the first cathode current collecting membrane 92a.

The second power generation element 21b on the first principal surface 503b and the fourth power generation element 22b on the second principal surface 504b are mutually connected in series on each second supporting substrate 5b. For example, the second power generation element 21b and the fourth power generation element 22b are connected by a current collecting member that extends from the first principal surface 503b to the second principal surface 504b. The second power generation element 21b and the fourth power generation element 22b that are connected in series on each second supporting substrate 5b configures the second power generation element assembly 202. The current collecting member that connects second power generation element 21b and the fourth power generation element 22b can be formed from the same material as the first cathode current collecting membrane 92a.

The first power generation element assembly 201 is connected in series with the second power generation element assembly 202. The fuel cell stack 100 includes a plurality of first power generation element aggregate bodies 201 and a plurality of second power generation element aggregate bodies 202. Each first power generation element assembly 201 is connected in series. Each second power generation element assembly 202 is connected in series.

Method of Power Generation

The fuel cell stack 100 configured as described above is configured to supply a fuel gas such as hydrogen gas or the like to the first chamber 41 of the manifold 4, and expose the first and the second cells 10a, 10b to a gas that includes oxygen, such as air or the like. In this manner, a chemical reaction as shown by Formula (1) below occurs in the first cathode 8a and the second cathode 8b, a chemical reaction as shown by Formula (2) below occurs in the first anode 6a and the second anode 6b, and thereby a current is caused to flow.

$$(1/2) \cdot O_2 + 2e^- \rightarrow O_2^- \qquad (1)$$

$$H_2 + O_2^- \rightarrow H_2O + 2e^- \qquad (2)$$

More specifically, the fuel gas supplied to the first chamber 41 flows into the first gas flow passage 53a of each first cell 10a, and thereby a chemical reaction as shown by Formula (2) occurs in the first anode 6a of each first and third power generation element 21a, 22a. The unreacted fuel gas in each first anode 6a exits the first gas flow passage 53a, and is supplied through the passage 30 of the communicating member 3 to the second gas flow passage 53b. The fuel gas supplied to the second gas flow passage 53b undergoes a chemical reaction as shown by Formula (2) in each second anode 6b of each second and fourth power generation element 21b, 22b of the second cell 10b. The unreacted fuel gas in the second anode 6b is recovered into the second chamber 42 of the manifold 4.

MODIFIED EXAMPLES

Although the embodiments of the present invention have been described, the present invention is not limited to those embodiments, and various changes or modifications may be added within a scope that does not depart from the scope of the invention.

Modified Example 1

For example, in the above embodiment, fuel gas is supplied to the first chamber 41, and fuel gas is discharged from the second chamber 42. However there is no particular limitation in relation to the flow of the fuel gas, and for example, fuel gas may be supplied to the second chamber 42, and fuel gas may be discharged from the first chamber 41. That is to say, the fuel gas may flow in the order of second gas flow passage, communicating member 3, and first gas flow passage.

Modified Example 2

In the above embodiment, although the first supporting substrate 5a includes a plurality of the first gas flow passages 53a, the number of the first gas flow passages 53a may be one. In such a configuration, the first gas flow passage 53a preferably has a flat shape.

Modified Example 3

In the above embodiment, although the first cell 10a and the second cell 10b are disposed side by side with the longitudinal direction (z axis direction) of the manifold 4, they may be disposed side by side with the transverse direction (y axis direction) of the manifold 4.

Modified Example 4

In the above embodiment, although the communicating member 3 is porous, the communicating member 3 may be formed by metal. More specifically, the communicating member 3 may be configured by an Fe—Cr alloy, a Ni-based alloy, or an MgO-type ceramic material (which may be the same as the material used in the first and second supporting substrate 5a, 5b), or the like.

Modified Example 5

Figure 8:
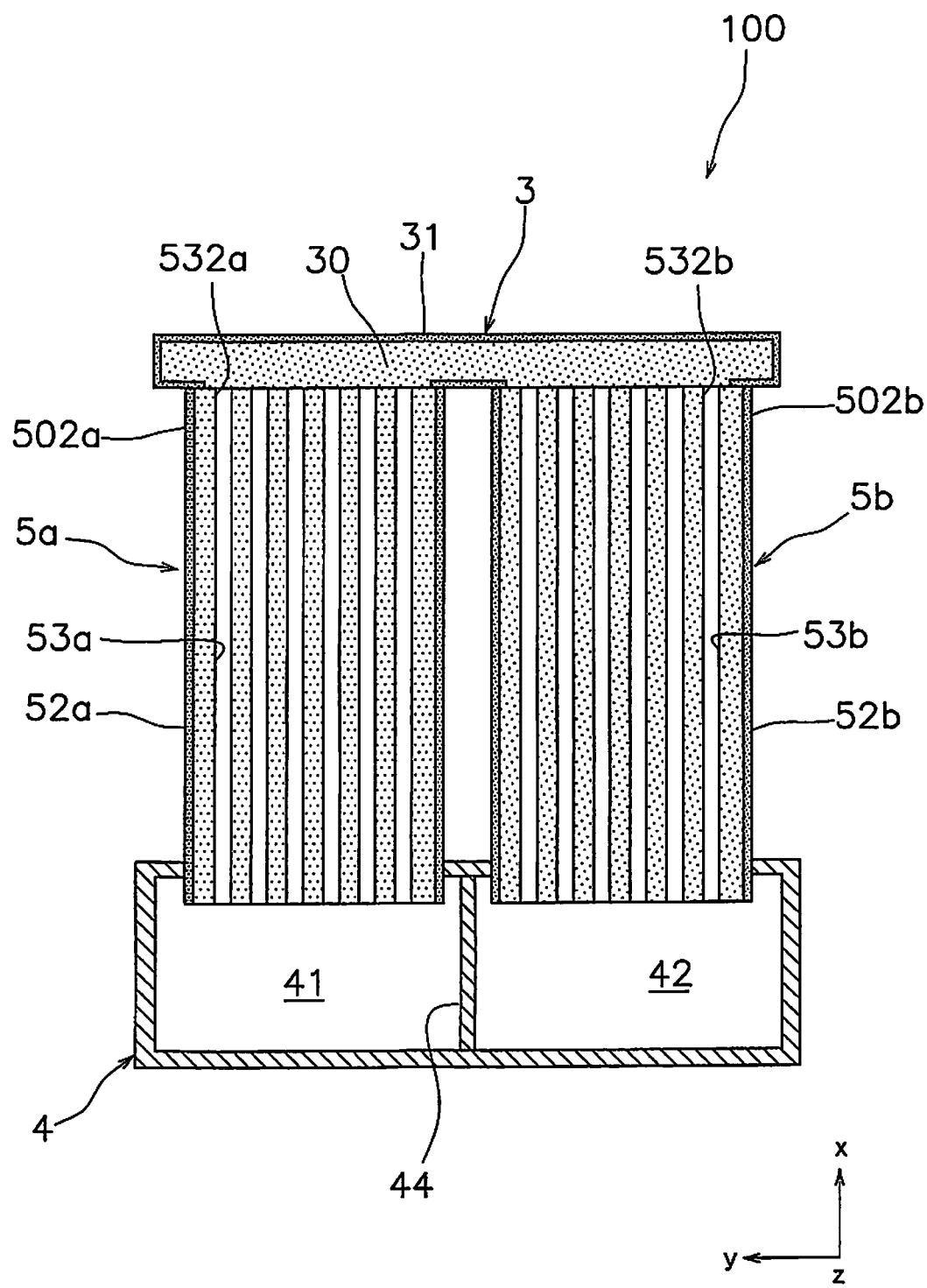
FIG. 8 is a sectional view of a fuel cell stack according to a modified example.

In the above embodiment, although the passage 30 of the communicating member 3 is formed by a cavity, there is no limitation in relation to the configuration of the passage 30 of the communicating member 3. For example, as illustrated in FIG. 8, the passage 30 of the communicating member 3 may be configured by a plurality of pores formed in the communicating member 3.

Modified Example 6

Figure 9:
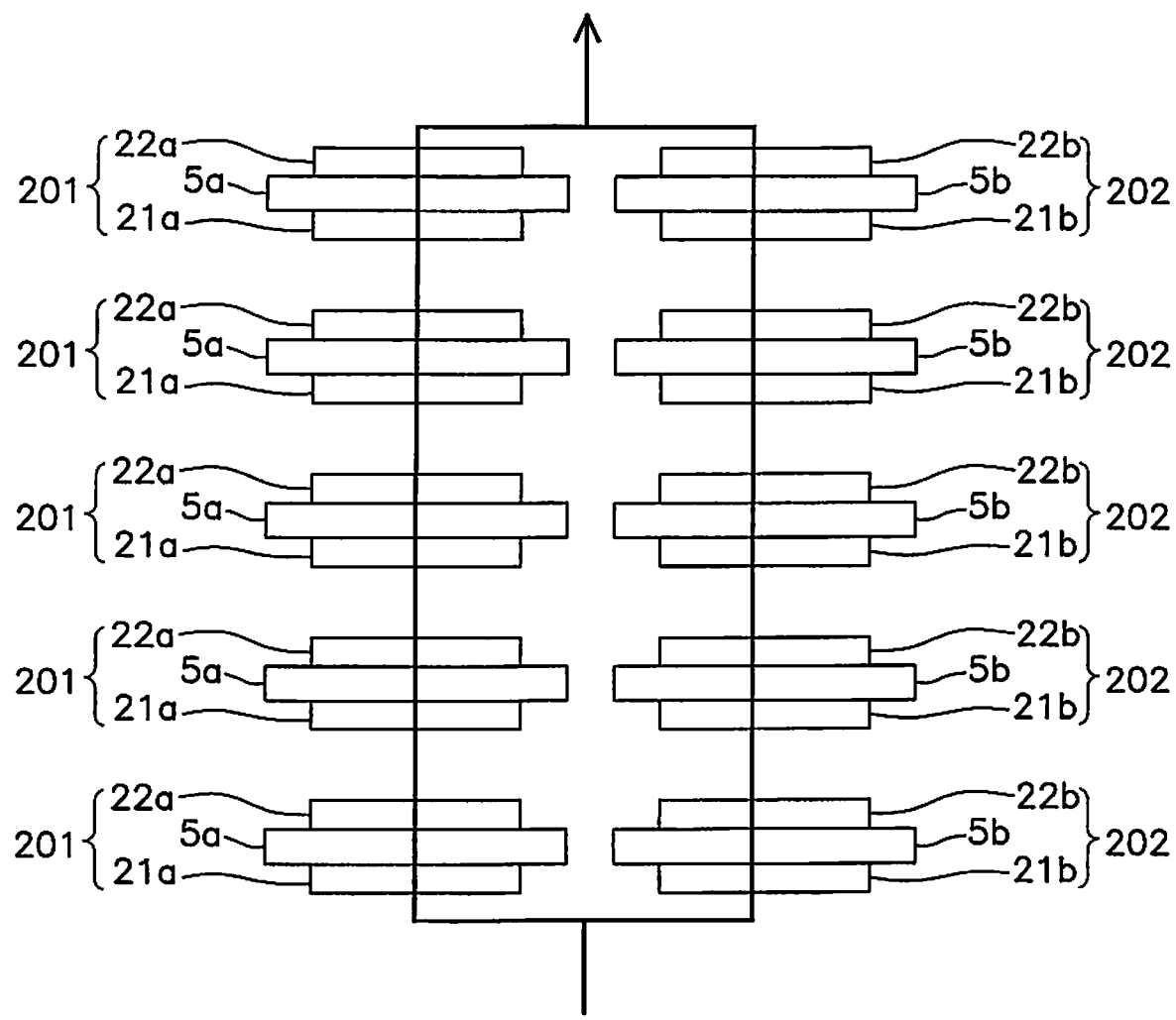
FIG. 9 is a schematic view illustrating the electrical connection relationships between each power generation element according to a modified example.

As illustrated in FIG. 9, the first power generation element assembly 201 and the second power generation element assembly 202 may be mutually connected in parallel. More specifically, a plurality of first power generation element aggregate bodies 201 that are mutually connected in series may be mutually connected in parallel with a plurality of second power generation element aggregate bodies 202 that are mutually connected in series.

Modified Example 7

Figure 10:
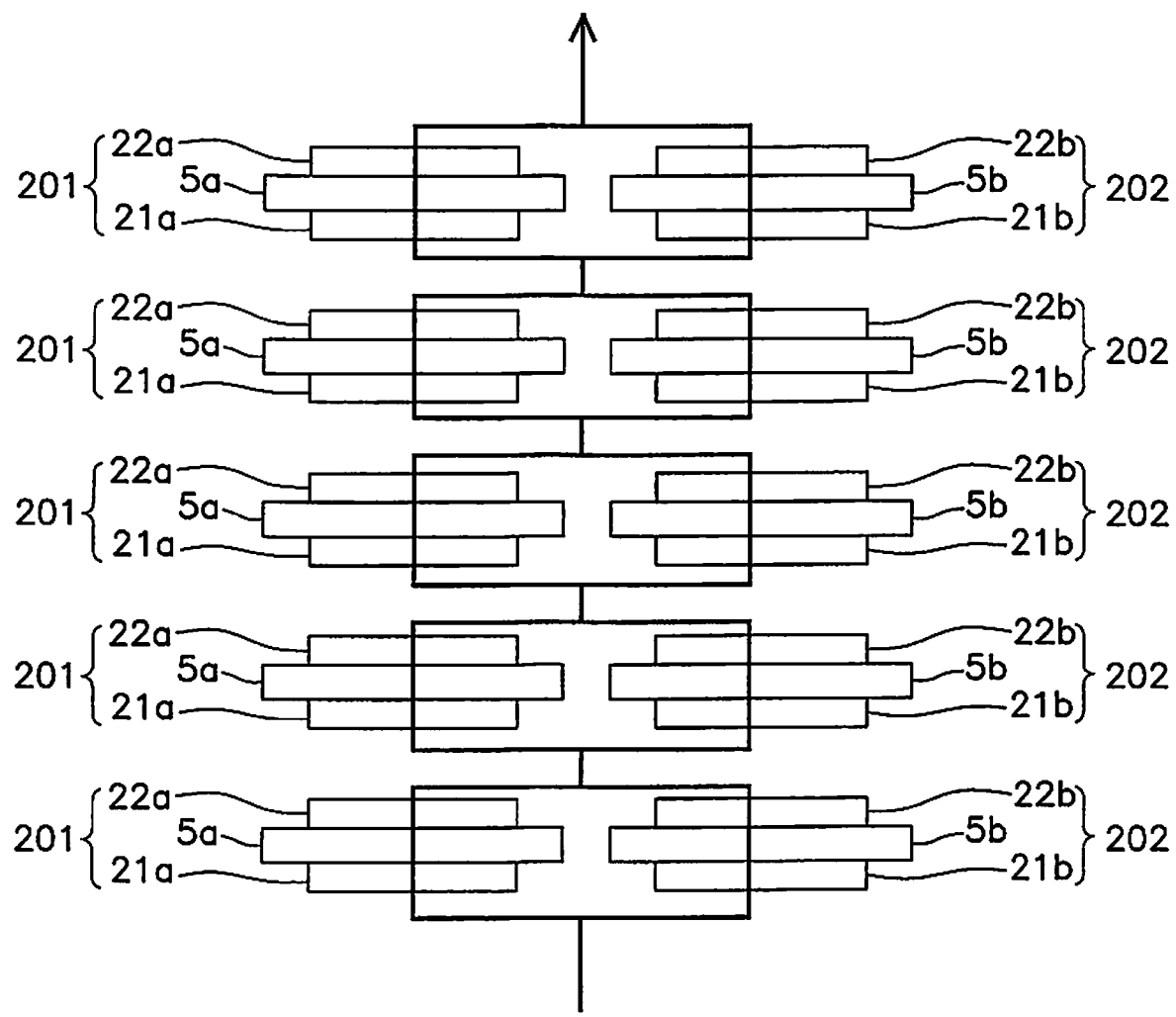
FIG. 10 is a schematic view illustrating the electrical connection relationships between each power generation element according to a modified example.

As illustrated in FIG. 10, the first power generation element assembly 201 and the second power generation element assembly 202 may be mutually connected in parallel. More specifically, a group of first and second power generation element aggregate bodies 201, 202 that are mutually connected in parallel may be connected in series with another group of first and second power generation element aggregate bodies 201, 202 that are mutually connected in parallel.

Modified Example 8

Figure 11:
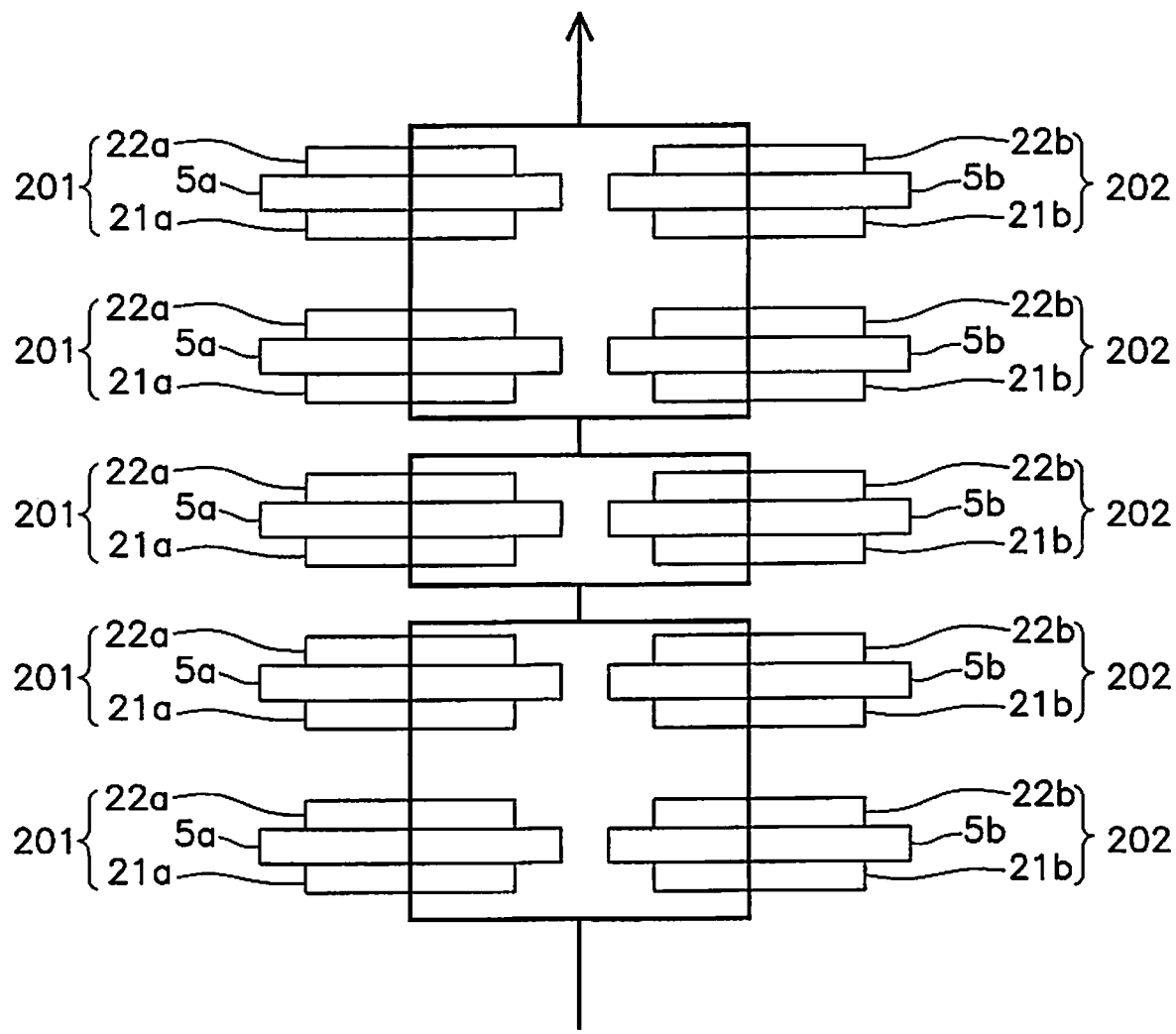
FIG. 11 is a schematic view illustrating the electrical connection relationships between each power generation element according to a modified example.

In the embodiment illustrated in FIG. 10, the number of first and second power generation element aggregate bodies 201, 202 that are mutually connected in parallel is one. However for example as illustrated in FIG. 11, the number of first and second power generation element aggregate bodies 201, 202 that are connected in parallel may be suitably varied.

Modified Example 9

There is no requirement for the first power generation element 21a and the third power generation element 22a to be connected in series in all of the first cells 10a. The first power generation element 21a and the third power generation element 22a may not be mutually connected in series in a portion of the first cells 10a. The same comments also apply to the second cells 10b.

Modified Example 10

In the above embodiment, the first power generation element 21a and the third power generation element 22a are connected in series and the second power generation element 21b and the fourth power generation element 22b are connected in series. However, there is no limitation in relation to the method of electrical connection in relation to the first to fourth power generation elements 21a, 22a, 21b, 22b.

Figure 12:
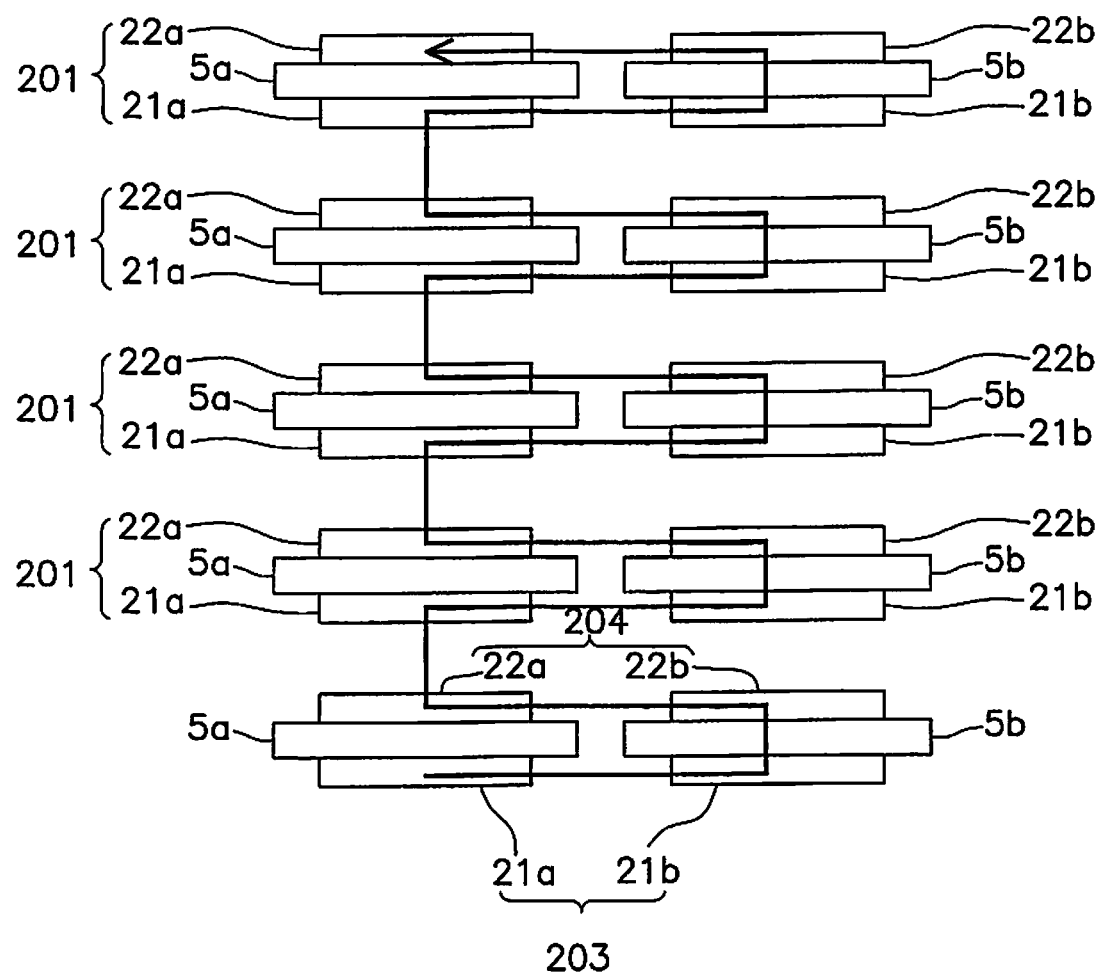
FIG. 12 is a schematic view illustrating the electrical connection relationships between each power generation element according to a modified example.

For example, as illustrated in FIG. 12, the first power generation element 21a that is supported on the first principal surface 503a of the first supporting substrate 5a and the second power generation element 21b that is supported on the first principal surface 503b of the second supporting substrate 5b in each first and second cells 10a, 10b that are adjacent in the transverse direction (y axis direction) may be mutually connected in series. For example, the first power generation element 21a and the second power generation element 21b may be electrically connected by a current collecting member that is configured to extend between the first supporting substrate 5a and the second supporting substrate 5b. The first power generation element 21a and the second power generation element 21b that are connected in series configure the third power generation element assembly 203. The current collecting member that connects the first power generation element 21a and the second power generation element 21b may be formed using an Fe—Cr alloy, or platinum, or the like.

The third power generation element 22a that is supported on the second principal surface 504a of the first supporting substrate 5a and the fourth power generation element 22b that is supported on the second principal surface 504b of the second supporting substrate 5b in each of the first and second cells 10a, 10b that are adjacent in the transverse direction (y axis direction) may be mutually connected in series. For example, the third power generation element 22a and the fourth power generation element 22b may be electrically connected by a current collecting member that is configured to extend between the first supporting substrate 5a and the second supporting substrate 5b. The third power generation element 22a and the fourth power generation element 22b that are connected in series configure the fourth power generation element assembly 204. The current collecting member that connects the third power generation element 22a and the fourth power generation element 22b may be formed using an Fe—Cr alloy, or platinum, or the like.

The third power generation element assembly 203 is connected in series with the fourth power generation element assembly 204. The fuel cell stack 100 includes a plurality of third power generation element aggregate bodies 203 and a plurality of fourth power generation element aggregate bodies 204. Each third power generation element assembly 203 and each fourth power generation element assembly 204 is mutually connected in series. The third power generation element assembly 203 and the fourth power generation element assembly 204 are alternately connected.

Modified Example 11

Figure 13:
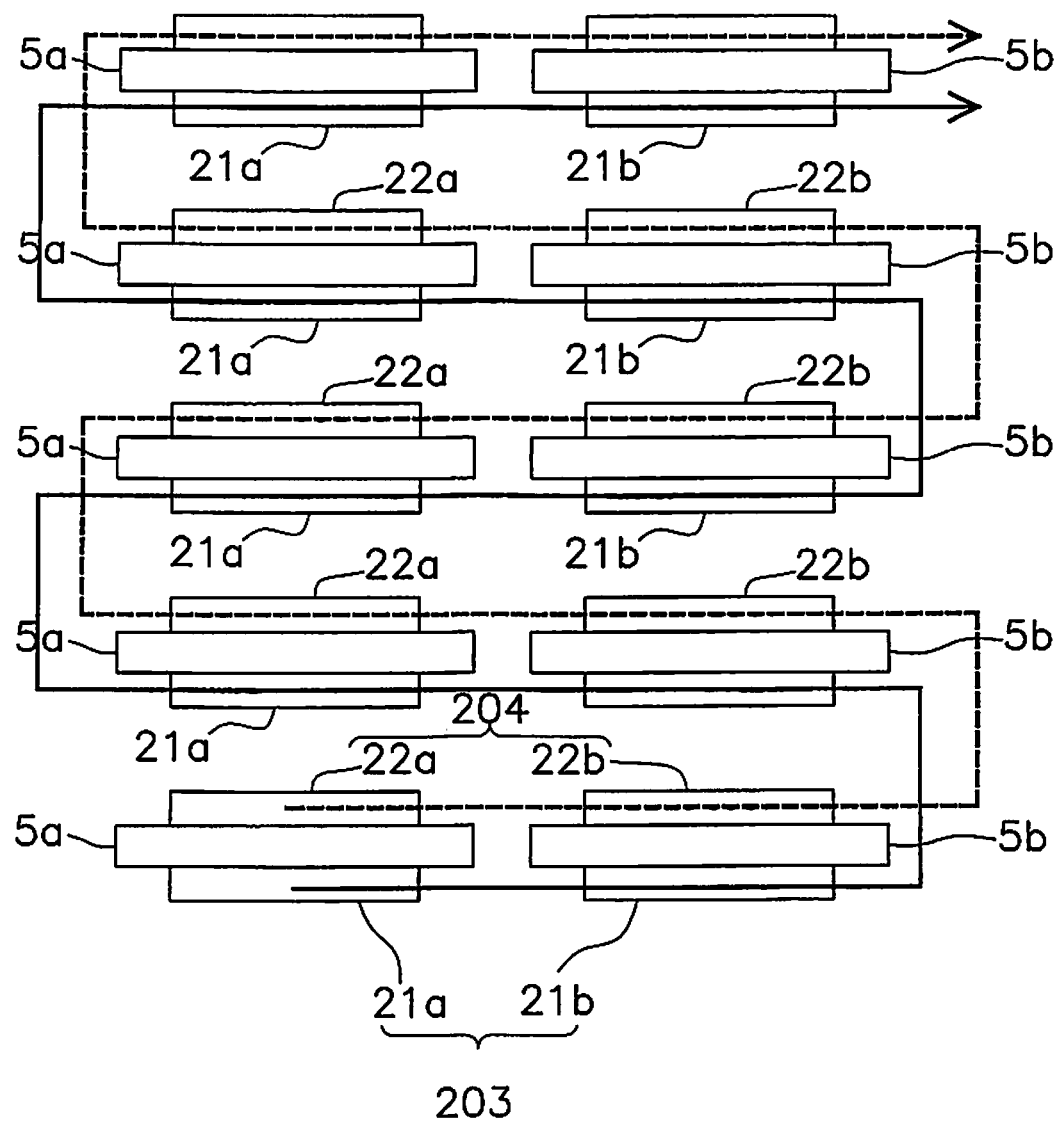
FIG. 13 is a schematic view illustrating the electrical connection relationships between each power generation element according to a modified example.

In Modified Example 10, although the third power generation element assembly 203 is connected in series with the fourth power generation element assembly 204, as illustrated in FIG. 13, the third power generation element assembly 203 and the fourth power generation element assembly 204 may be mutually connected in parallel. More specifically, the plurality of the third power generation element aggregate bodies 203 that is mutually connected in series is mutually connected in parallel with the plurality of the fourth power generation element aggregate bodies 204 that is mutually connected in series.

Modified Example 12

Figure 14:
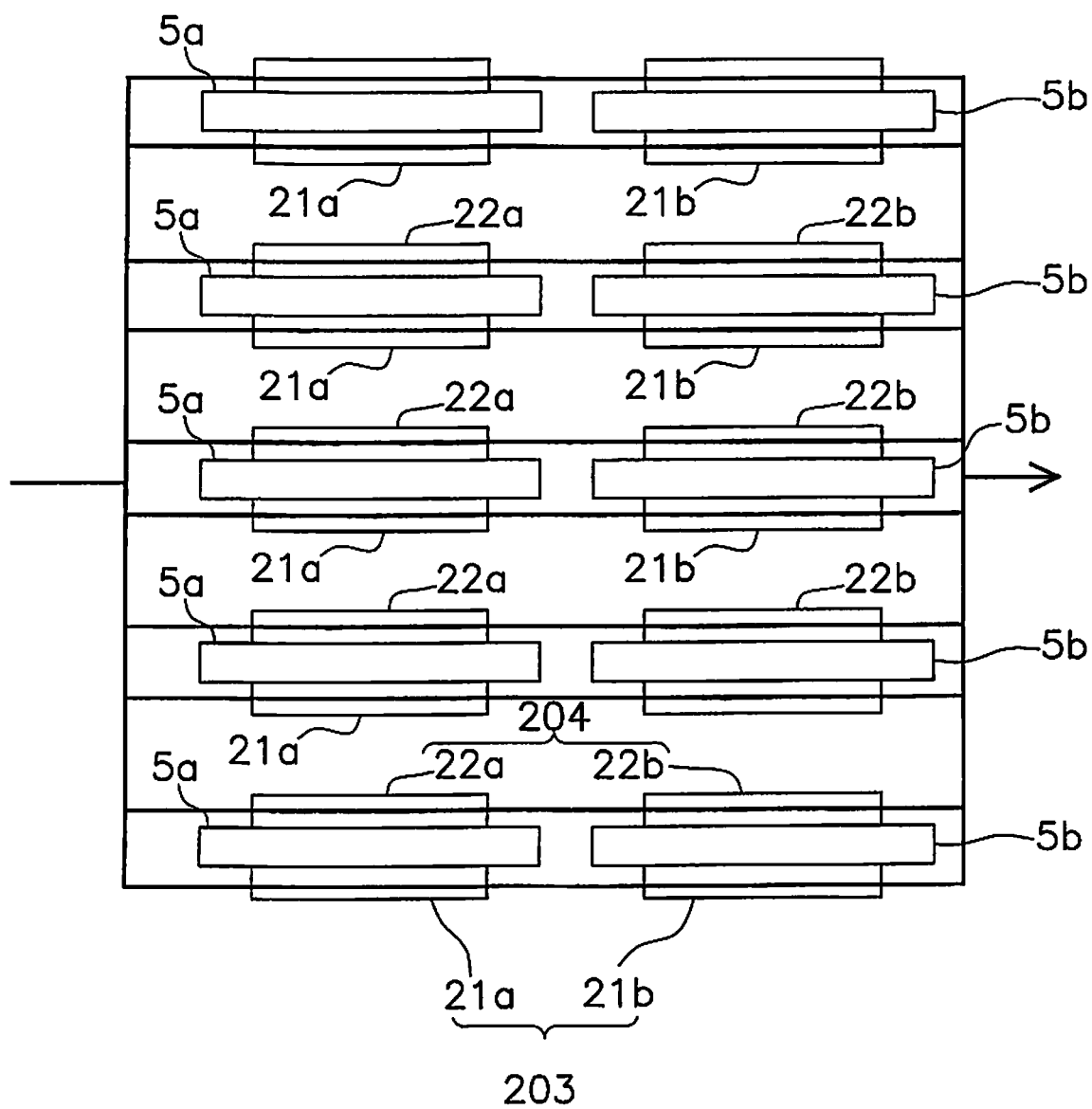
FIG. 14 is a schematic view illustrating the electrical connection relationships between each power generation element according to a modified example.

In Modified Example 11, although the third power generation element assembly 203 is mutually connected in parallel with the fourth power generation element assembly 204, as illustrated in FIG. 14, each third power generation element assembly 203 may be mutually connected in parallel.

Furthermore, each fourth power generation element assembly 204 may be mutually connected in parallel.

Modified Example 13

In Modified Example 10 to Modified Example 12, there is no requirement for all of the first power generation elements 21a and the second power generation elements 21b to be connected in series, and a portion of the first power generation element 21a and the second power generation element 21b may not be connected in series. In the same manner, a portion of the third power generation element 22a may not be connected in series to the fourth power generation element 22b.

Modified Example 14

Figure 15:
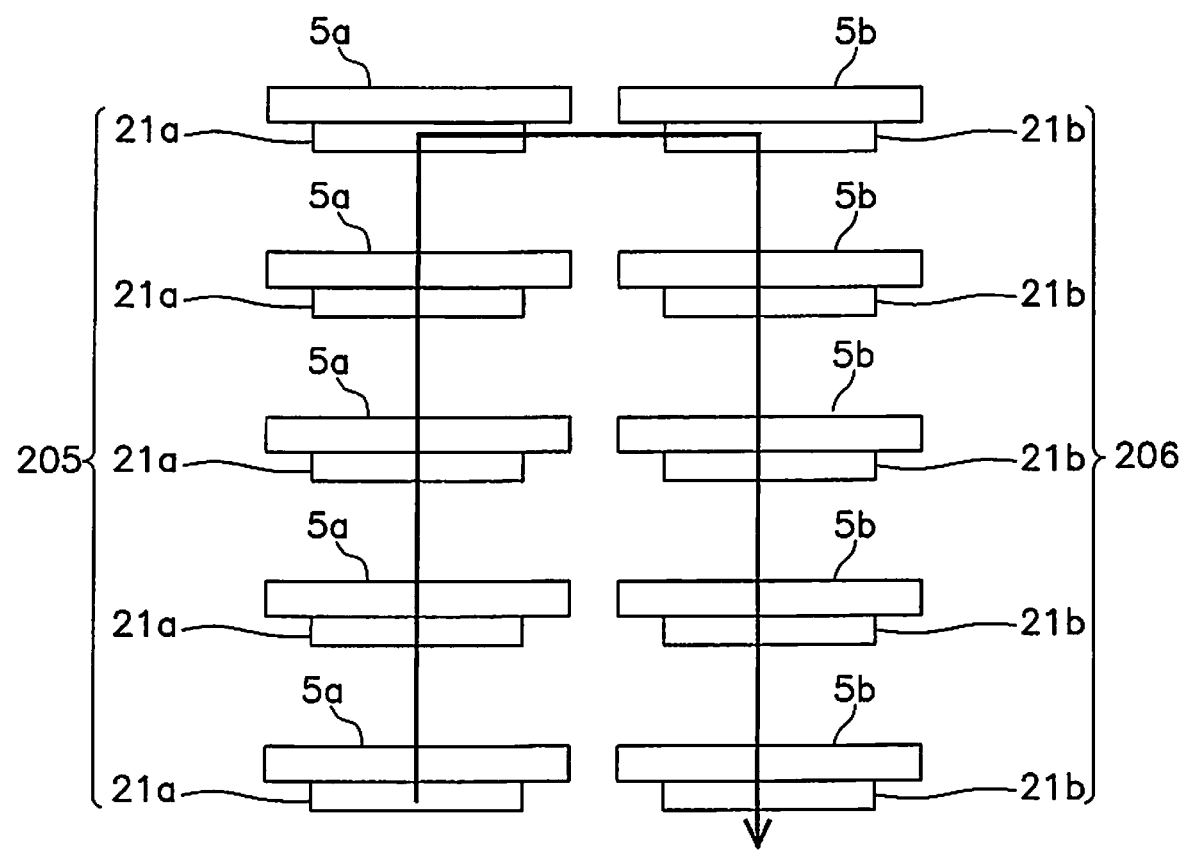
FIG. 15 is a schematic view illustrating the electrical connection relationships between each power generation element according to a modified example.

As illustrated in FIG. 15, there is no requirement for each first supporting substrate 5a to support the third power generation element 22a on the second principal surface 504a. In this configuration, the first power generation element 21a that is supported on each first supporting substrate 5a may be connected in series with the first power generation element 21a that is supported on adjacent first supporting substrates 5a. The plurality of first power generation elements 21a that is connected in series configures a fifth power generation element assembly 205.

There is no requirement for each second supporting substrate 5b to support the fourth power generation element 22b on the second principal surface 504a. In this configuration, the second power generation element 21b that is supported on each second supporting substrate 5b may be connected in series with the second power generation element 21b that is supported on adjacent second supporting substrates 5b. The plurality of second power generation elements 21b that is connected in series configures a sixth power generation element assembly 206. The fifth power generation element assembly 205 is connected in series with the sixth power generation element assembly 206.

Modified Example 15

Figure 16:
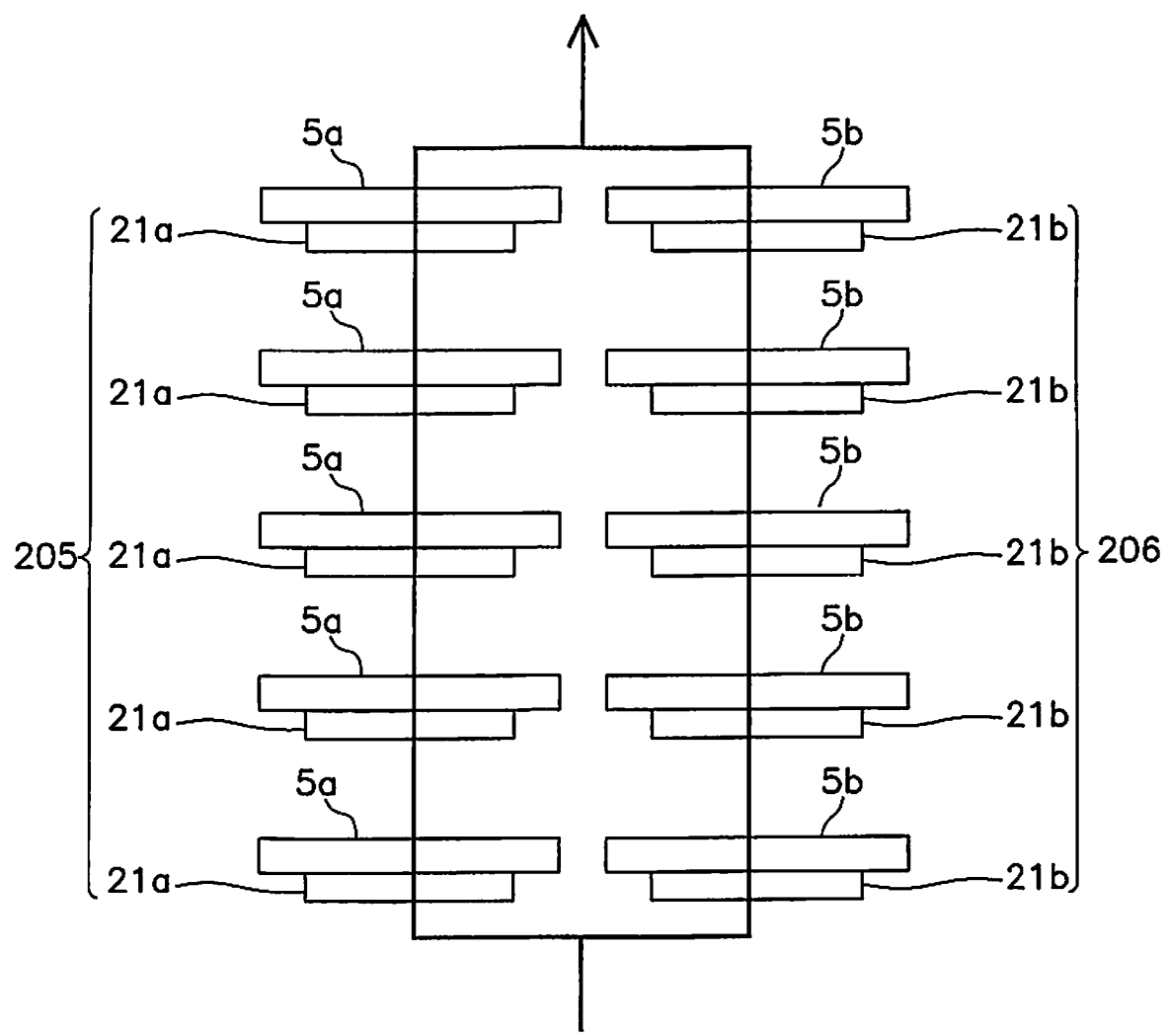
FIG. 16 is a schematic view illustrating the electrical connection relationships between each power generation element according to a modified example.

In Modified Example 14, although the fifth power generation element assembly 205 is connected in series with the sixth power generation element assembly 206, as illustrated in FIG. 16, the fifth power generation element assembly 205 may be mutually connected in parallel with the sixth power generation element assembly 206.

Modified Example 16

Figure 17:
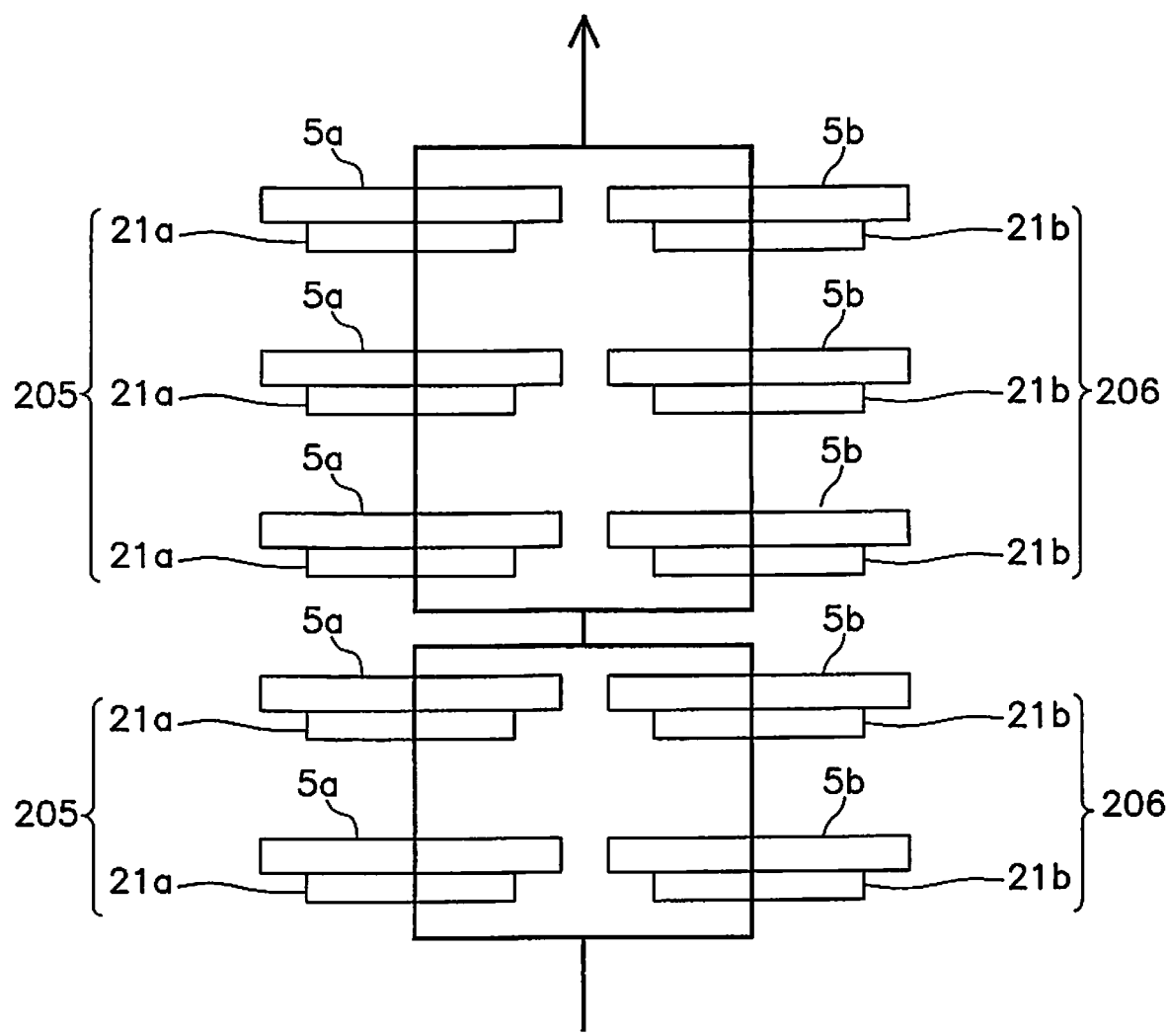
FIG. 17 is a schematic view illustrating the electrical connection relationships between each power generation element according to a modified example.

In Modified Example 15, although the fifth power generation element assembly 205 is mutually connected in parallel with the sixth power generation element assembly 206, there is no limitation in this regard. For example, as illustrated in FIG. 17, the fifth and sixth power generation element aggregate bodies 205, 206 that are connected in parallel may be connected in series with other fifth and sixth power generation element aggregate bodies 205, 206 that are connected in parallel. There is no limitation in relation to the number of power generation elements that are included in each of the power generation element aggregate bodies 205, 206.

Modified Example 17

Figure 18:
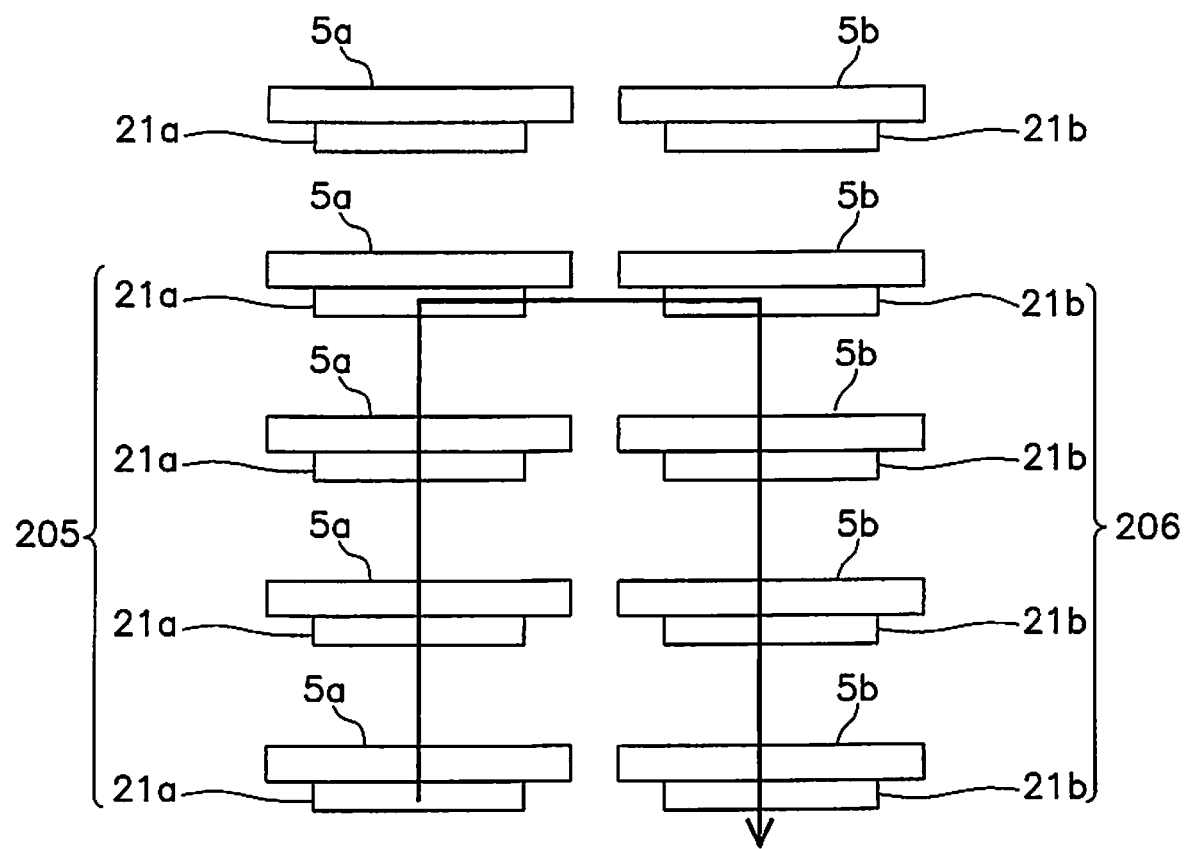
FIG. 18 is a schematic view illustrating the electrical connection relationships between each power generation element according to a modified example.

In Modified Example 14 to Modified Example 16, there is no requirement for all of the first power generation elements 21a to be connected in series. For example, as illustrated in FIG. 18, a portion of the first power generation elements 21a of the plurality of first power generation elements 21a may be connected in series to thereby configure the fifth power generation element assembly 205. In the same manner, a portion of the second power generation elements 21b of the plurality of second power generation elements 21b may be connected in series to thereby configure the sixth power generation element assembly 206.

Modified Example 18

Figure 19:
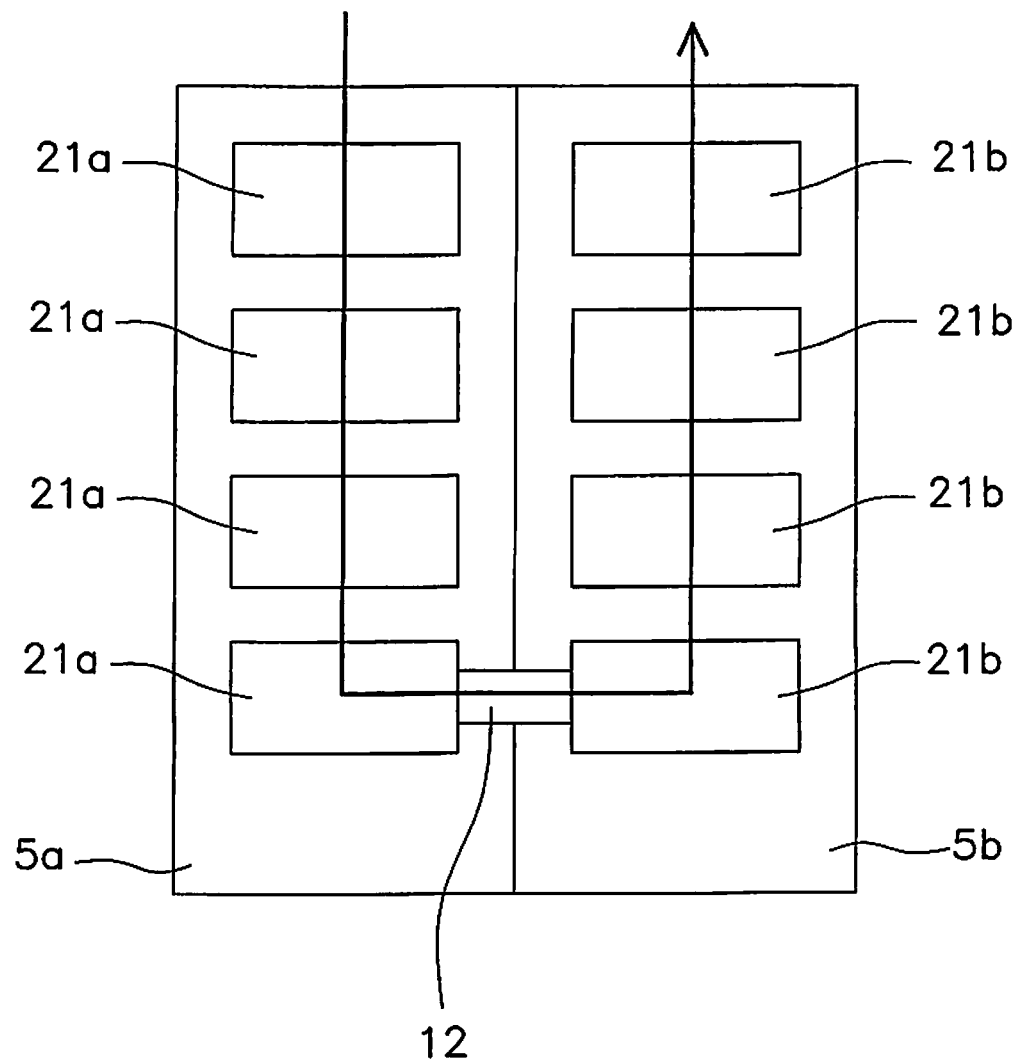
FIG. 19 is a schematic view illustrating the electrical connection relationships between each power generation element according to a modified example.

As illustrated in FIG. 19, one of the plurality of first power generation elements 21a may be connected through a current collection member 12 in series with one of plurality of the second power generation elements 21b. The current collecting member 12 may be formed using an Fe—Cr alloy, or platinum, or the like.

For example, the most proximate first power generation element 21a of the first power generation elements 21a may be connected in series with the most proximate second power generation element 21b of the second power generation elements 21b. Furthermore, the most distal first power generation element 21a of the first power generation elements 21a may be connected in series with the most distal second power generation element 21b of the second power generation elements 21b.

Figure 20:
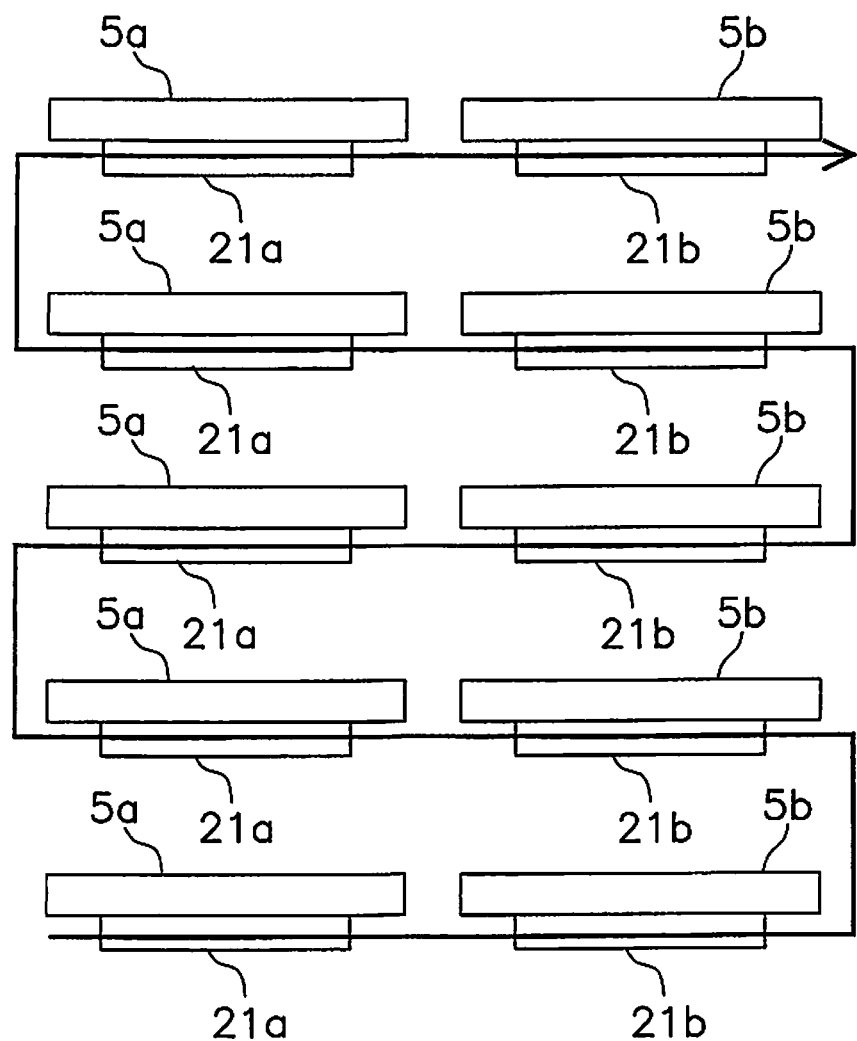
FIG. 20 is a schematic view illustrating the electrical connection relationships between each power generation element according to a modified example.
Figure 21:
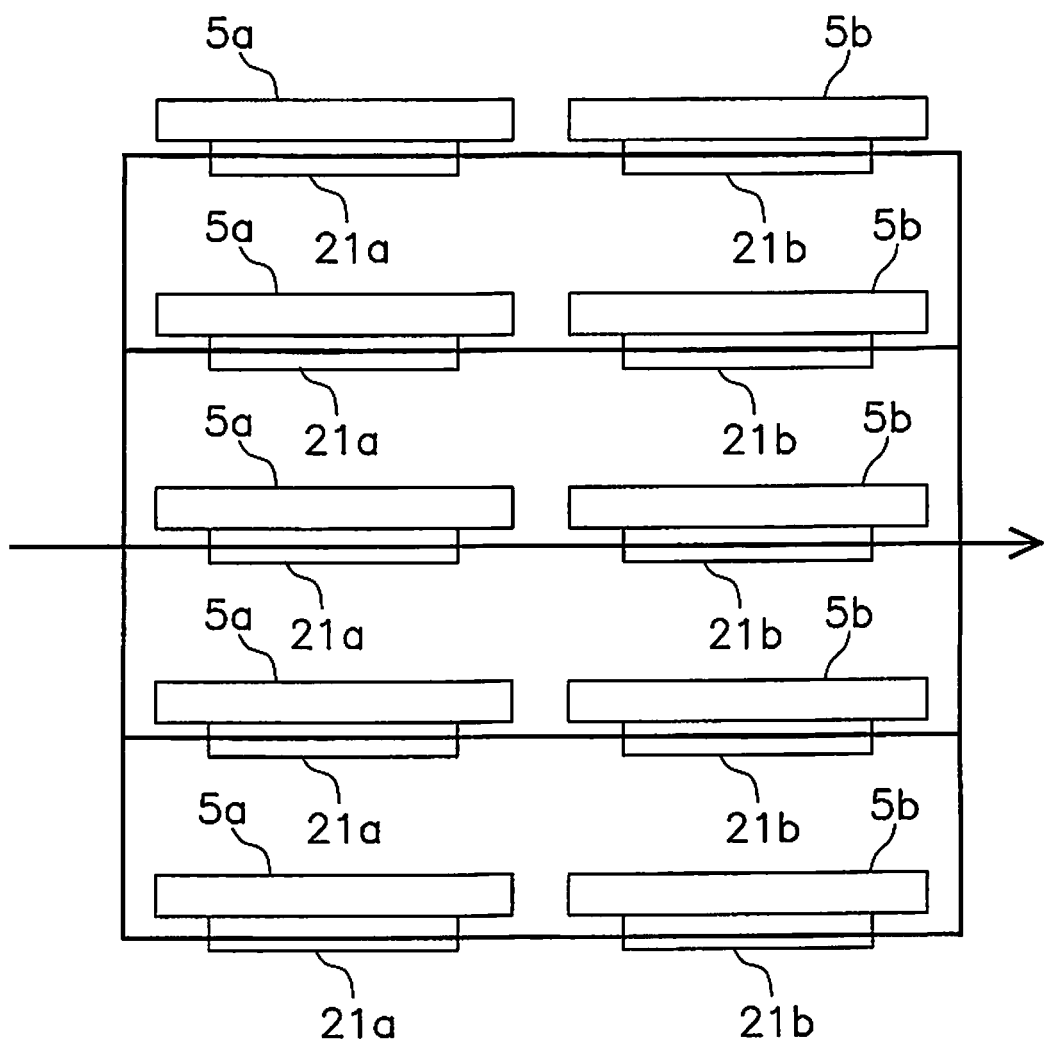
FIG. 21 is a schematic view illustrating the electrical connection relationships between each power generation element according to a modified example.

As illustrated in FIG. 20 and FIG. 21, each first and second power generation element 21a, 21b that is electrically connected as described above may be connected in series with each first and second power generation element 21a, 21b that is electrically connected with adjacent first and second supporting substrates 5a, 5b (FIG. 20), may be connected in parallel (FIG. 21), or may be connected in a combination of series and parallel.

Modified Example 19

Figure 22:
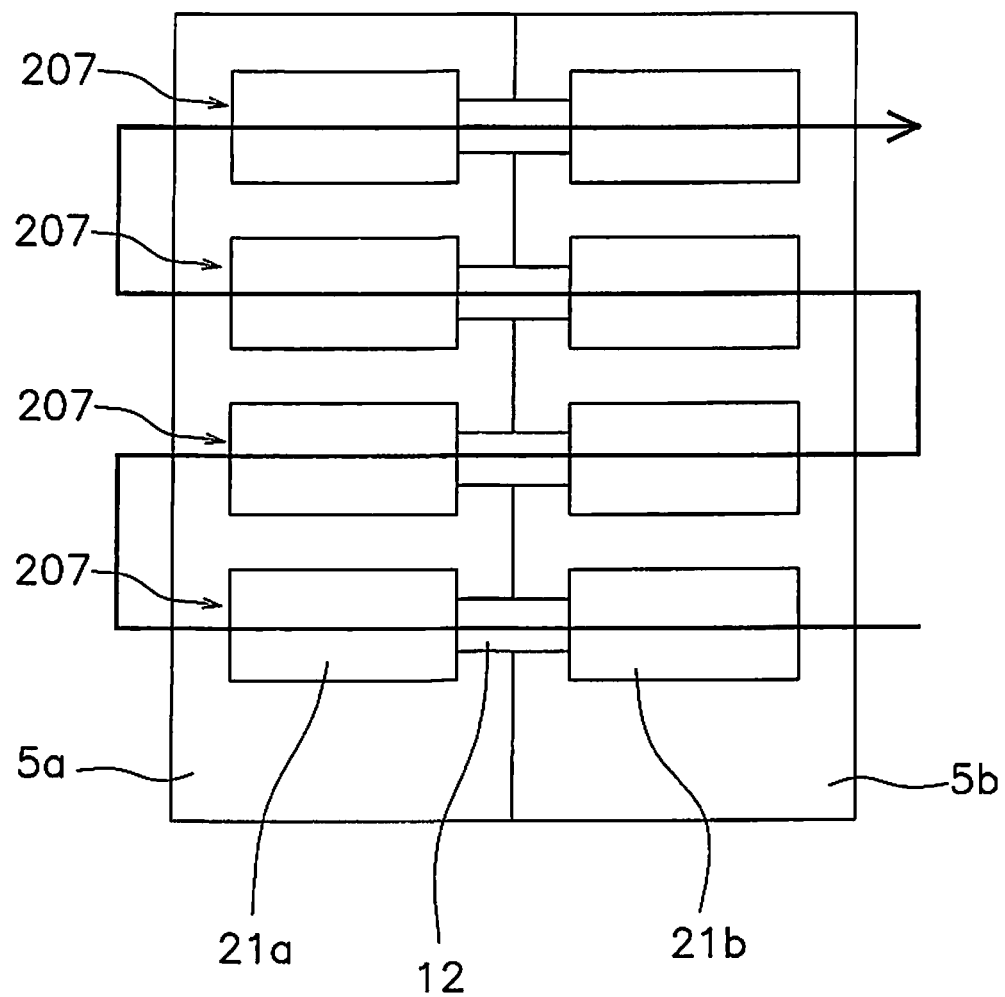
FIG. 22 is a schematic view illustrating the electrical connection relationships between each power generation element according to a modified example.
Figure 23:
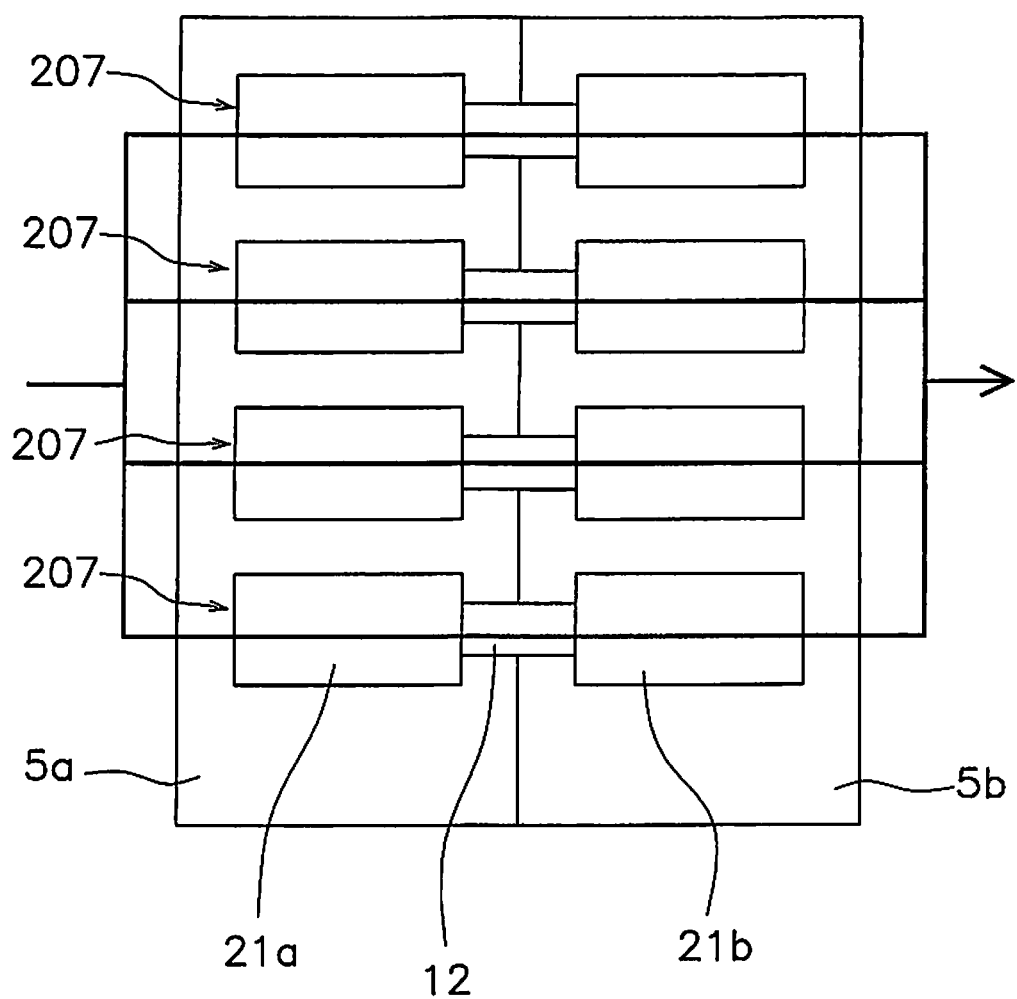
FIG. 23 is a schematic view illustrating the electrical connection relationships between each power generation element according to a modified example.

In Modified Example 18, although a plurality of first power generation elements 21a disposed on the first supporting substrate 5a may be mutually connected in series, there is no particular limitation in this regard. For example, as illustrated in FIG. 22, the fuel cell stack 100 may be provided with a plurality of seventh power generation element aggregate bodies 207 that are formed from a pair of first and second power generation elements 21a, 21b. The pair of first and second power generation elements 21a, 21b that configures the seventh power generation element aggregate bodies 207 is mutually connected in series through the current collection member 12. Each seventh power generation element assembly 207 may be connected in series. Alternatively, as illustrated in FIG. 23, each seventh power generation element assembly 207 may be mutually connected in parallel.

Modified Example 20

In Modified Example 18 and Modified Example 19, there is no requirement for all of the first power generation elements 21a to be connected in series with the second power generation elements 21b, and a portion of the first power generation elements 21a may be not connected in series with the second power generation elements 21b.

Modified Example 21

The above embodiment and each of the modified examples may be suitably combined.

Modified Example 22

There is no particular limitation in relation to the direction of flow of the current in the above embodiment and each of the modified examples, and the flow of current as illustrated by the arrow in FIG. 7 and FIG. 9 to FIG. 23 of the above embodiment and each of the modified examples may be reversed.

Modified Example 23

Although the first and second cells 10a, 10b in the above embodiment and each of the modified examples have a horizontally-striped configuration, a vertically-striped configuration is possible. Furthermore, although the first and the second cells 10a, 10b have a flat-tube configuration, a cylindrical configuration is possible.

Modified Example 24

In the above embodiment and each of the modified examples, although a plurality of power generation elements 21a, 22a, 21b, 22b is formed on each principal surface 503a, 504a, 503b, 504b of each supporting substrate 5a, 5b, there is no limitation to the number of each power generation element 21a, 22a, 21b, 22b. For example, the number of power generation elements 21a, 22a, 21b, 22b formed on each principal surface 503a, 504a, 503b, 504b may be one.

The invention claimed is:

1. A fuel cell stack comprising:
a plurality of first fuel cells, each of the first fuel cells including:
a first power generation element, a first supporting substrate including a first substrate main portion supporting the first power generation element, a first dense layer covering the first substrate main portion, and a first gas flow passage extending from a proximal end portion of the first supporting substrate to a distal end portion of the first supporting substrate;
a plurality of second fuel cells, each of the second fuel cells including:
a second power generation element, a second supporting substrate including a second substrate main portion supporting the second power generation element, a second dense layer covering the second substrate main portion, and a second gas flow passage extending from a proximal end portion of the second supporting substrate to a distal end portion of the second supporting substrate;
a plurality of communicating members each extending between the distal end portion of the first supporting substrate of a respective one of the plurality of first fuel cells and the distal end portion of the second supporting substrate of a respective one of the plurality of second fuel cells, and communicating between the first gas flow passage and the second gas flow passage; and
a manifold supporting the proximal end portions of the first and second supporting substrates,
each of the first power generation elements being supported by a first principal surface of the respective first supporting substrate,
each of the second power generation elements being supported by a first principal surface of the respective second supporting substrate,
the plurality of first fuel cells being arranged along a first direction of the manifold,
the plurality of second fuel cells being arranged along the first direction with each of the plurality of second fuel cells being arranged adjacent to a respective one of the plurality of first fuel cells in a second direction that intersects the first direction, and
the plurality of communicating members being arranged along the first direction.

2. The fuel cell stack according to claim 1, wherein:
each of the plurality of first fuel cells includes a third power generation element supported by a second principal surface of the first supporting substrate and connected in series with the first power generation element; and
each of the plurality of second fuel cells includes a fourth power generation element supported by a second principal surface of the second supporting substrate and connected in series with the second power generation element.

3. The fuel cell stack according to claim 2, wherein each of the plurality of first fuel cells includes a first power generation element assembly formed from the first power generation element and the third power generation element, each of the plurality of second fuel cells includes a second power generation element assembly formed from the second power generation element and the fourth power generation element, and
- each of the first power generation element assemblies is connected in series with a respective one of the second power generation element assemblies.

4. The fuel cell stack according to claim 2, wherein
each of the plurality of first fuel cells includes a first power generation element assembly formed from the first power generation element and the third power generation element, each of the plurality of second fuel cells includes a second power generation element assembly formed from the second power generation element and the fourth power generation element, and
each of the first power generation element assemblies is connected in parallel with a respective one of the second power generation element assemblies.

5. The fuel cell stack according to claim 2, wherein
for each of the plurality of first fuel cells, a plurality of first power generation elements are disposed with an interval along a longitudinal direction of the first supporting substrate, and a plurality of third power generation elements are disposed with an interval along the longitudinal direction of the first supporting substrate; and
for each of the plurality of second fuel cells, a plurality of second power generation elements are disposed with an interval along a longitudinal direction of the second supporting substrate, and a plurality of fourth power generation elements are disposed with an interval along the longitudinal direction of the second supporting substrate.

6. The fuel cell stack according to claim 5, wherein
each of the first power generation elements is mutually connected in series;
each of the second power generation elements is mutually connected in series;
each of the third power generation elements is mutually connected in series; and
each of the fourth power generation elements is mutually connected in series.

7. The fuel cell stack according to claim 1, wherein:
each of the plurality of first fuel cells includes a third power generation element supported by a second principal surface of the first supporting substrate; and
each of the plurality of second fuel cells includes a fourth power generation element supported by a second principal surface of the second supporting substrate,
each of the first power generation elements is connected in series with a respective one of the second power generation elements; and
each of the third power generation elements is connected in series with a respective one of the fourth power generation elements.

8. The fuel cell stack according to claim 7, wherein
for each of the plurality of first fuel cells and a respective one of the plurality of second fuel cells, a third power generation element assembly formed from the first power generation element and the second power generation element is connected in series with a fourth power generation element assembly formed from the third power generation element and the fourth power generation element.

9. The fuel cell stack according to claim 7, wherein
for each of the plurality of first fuel cells and a respective one of the plurality of second fuel cells, a third power generation element assembly formed from the first power generation element and the second power generation element is connected in parallel with a fourth power generation element assembly formed from the third power generation element and the fourth power generation element.

10. The fuel cell stack according to claim 1, wherein
each of the first supporting substrates is mutually disposed with an interval;
the first power generation elements are connected in series;
each of the second supporting substrates is mutually disposed with an interval; and
the second power generation elements are mutually connected in series.

11. The fuel cell stack according to claim 10, wherein
a fifth power generation element assembly formed from the first power generation elements is connected in series with a sixth power generation element assembly formed from the second power generation elements.

12. The fuel cell stack according to claim 10, wherein
a fifth power generation element assembly formed from the first power generation elements is connected in parallel with a sixth power generation element assembly formed from the second power generation elements.

13. The fuel cell stack according to claim 10, wherein
each of the first supporting substrates supports a plurality of the first power generation elements that are disposed with an interval along the longitudinal direction of the first supporting substrate; and
each of the second supporting substrates supports a plurality of the second power generation elements that are disposed with an interval along the longitudinal direction of the second supporting substrate.

14. The fuel cell stack according to claim 13, wherein
each of the first power generation elements on each first supporting substrate is mutually connected in series; and
each of the second power generation elements on each second supporting substrate is mutually connected in series.

15. The fuel cell stack according to claim 1, wherein
each of the first power generation elements is connected in series with a respective one of the second power generation elements.

16. The fuel cell stack according to claim 15, wherein
for each of the plurality of first fuel cells, a plurality of first power generation elements are mutually disposed with an interval along a longitudinal direction of the first supporting substrate; and
for each of the plurality of second fuel cells, a plurality of second power generation elements are mutually disposed with an interval along a longitudinal direction of the second supporting substrate.

17. The fuel cell stack according to claim 16, wherein
each of the first power generation elements is mutually connected in series;
each of the second power generation elements is mutually connected in series; and
one first power generation element of the plurality of the first power generation elements is connected in series with one second power generation element of the plurality of the second power generation elements.

18. The fuel cell stack according to claim 16, comprising
a plurality of seventh power generation element aggregate bodies, wherein each of the seventh power generation element aggregate bodies is configured from a pair of the first and the second power generation elements that are mutually connected in series.

19. The fuel cell stack according to claim 18, wherein each of the seventh power generation element aggregate bodies is mutually connected in series.

20. The fuel cell stack according to claim 18, wherein each of the seventh power generation element aggregate bodies is mutually connected in parallel.

21. The fuel cell stack according to claim 1, wherein the first supporting substrate and the second supporting substrate are disposed so that a side surface of the first supporting substrate and a side surface of the second supporting substrate are facing.

22. The fuel cell stack according to claim 1, wherein each of the plurality of communicating members includes an outer surface formed of a third dense layer having a porosity of 7% or less.

23. A fuel cell stack comprising:
a plurality of first fuel cells, each of the plurality of first fuel cells including:
a first power generation element, a first supporting substrate including a first substrate main portion supporting the first power generation element, a first dense layer covering the first substrate main portion, and a first gas flow passage extending from a proximal end portion of the first supporting substrate to a distal end portion of the first supporting substrate;
a plurality of second fuel cells, each of the plurality of second fuel cells including:
a second power generation element, a second supporting substrate including a second substrate main portion supporting the second power generation element, a second dense layer covering the second substrate main portion, and a second gas flow passage extending from a proximal end portion of the second supporting substrate to a distal end portion of the second supporting substrate; and
a plurality of porous communicating members each extending between the distal end portion of the first supporting substrate of a respective one of the plurality of first fuel cells and the distal end portion of the second supporting substrate of a respective one of the plurality of second fuel cells, each of the porous communicating members including a cavity connecting the first gas flow passage to the second gas flow passage,
the first power generation element being supported by a first principal surface of the first supporting substrate, and
the second power generation element being supported by a first principal surface of the second supporting substrate,
the plurality of first fuel cells being arranged along a first direction,
the plurality of second fuel cells being arranged along the first direction with each of the plurality of second fuel cells being arranged adjacent to a respective one of the plurality of first fuel cells in a second direction that intersects the first direction, and
the plurality of porous communicating members being arranged along the first direction.

24. The fuel cell stack according to claim 23, wherein each of the plurality of porous communicating members includes an outer surface formed of a third dense layer having a porosity of 7% or less.

* * * * *